US010558605B2

(12) United States Patent
Hong et al.

(10) Patent No.: US 10,558,605 B2
(45) Date of Patent: Feb. 11, 2020

(54) ELECTRONIC DEVICE AND METHOD FOR CONTROLLING A MODE OF CONNECTION INTERFACE

(71) Applicant: SAMSUNG ELECTRONICS CO., LTD., Suwon-si, Gyeonggi-do (KR)

(72) Inventors: Minwhoa Hong, Suwon-si (KR); Hyunkee Min, Sangju-si (KR); Jung-Hun Lee, Suwon-si (KR); Doosuk Kang, Suwon-si (KR); Subramanyam Nalli, Suwon-si (KR); Chounjong Nam, Yongin-si (KR); Taehun Lim, Gwacheon-si (KR); Sunkey Lee, Seongnam-si (KR); Bokun Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 23 days.

(21) Appl. No.: 15/945,012

(22) Filed: Apr. 4, 2018

(65) Prior Publication Data
US 2018/0293200 A1    Oct. 11, 2018

(30) Foreign Application Priority Data
Apr. 7, 2017    (KR) .................... 10-2017-0045448

(51) Int. Cl.
*G06F 13/40*    (2006.01)
*G06F 13/42*    (2006.01)
(Continued)

(52) U.S. Cl.
CPC ............ *G06F 13/4068* (2013.01); *G06F 1/10* (2013.01); *G06F 11/1415* (2013.01);
(Continued)

(58) Field of Classification Search
None
See application file for complete search history.

(56) References Cited

U.S. PATENT DOCUMENTS

| 2005/0197017 A1* | 9/2005 | Chou | G06F 13/385 439/660 |
| 2012/0177020 A1* | 7/2012 | Chou | H04W 76/20 370/338 |

(Continued)

*Primary Examiner* — Scott C Sun
(74) *Attorney, Agent, or Firm* — Nixon & Vanderhye P.C.

(57) ABSTRACT

An electronic device according to various embodiments may include a housing including a first surface facing a first direction and a second surface facing a second direction opposite the first direction, a touchscreen display exposed through a portion of the first surface, at least one wireless and/or wired communication circuit disposed inside the housing, at least one processor disposed inside the housing and electrically connected to the display and the communication circuit, and a memory disposed inside the housing and electrically connected to the processor. The communication circuit and/or the at least one processor may be configured to be in one of a plurality of states for exchanging data on a bus based on a plurality of generations of the peripheral component interconnect express (PCIe) standard. The plurality of states may include a first state using a first clock rate and a first data encoding rate based on a first one of the plurality of generations, a second state using a second clock rate and a second data encoding rate based on a second one of the plurality of generations, and a first recovery state defined in the first one of the plurality of generations.

9 Claims, 20 Drawing Sheets

(51) Int. Cl.
*G06F 11/14* (2006.01)
*G06F 1/10* (2006.01)
*G06F 11/30* (2006.01)

(52) U.S. Cl.
CPC ...... *G06F 11/3041* (2013.01); *G06F 11/3055* (2013.01); *G06F 13/4282* (2013.01); *G06F 2201/84* (2013.01)

(56) References Cited

U.S. PATENT DOCUMENTS

| | | | |
|---|---|---|---|
| 2013/0003513 A1* | 1/2013 | Higashide | G11B 19/12 369/47.15 |
| 2016/0147606 A1 | 5/2016 | Arroyo et al. | |
| 2016/0170929 A1 | 6/2016 | Pethe et al. | |

* cited by examiner

ELECTRONIC DEVICE AND METHOD FOR CONTROLLING A MODE OF CONNECTION INTERFACE

CROSS-REFERENCE TO RELATED APPLICATION

This application is based on and claims priority under 35 U.S.C. § 119 to Korean Patent Application No. 10-2017-0045448 filed on Apr. 7, 2017, in the Korean Intellectual Property Office, the disclosure of which is incorporated by reference herein its entirety.

BACKGROUND

1. Field

The disclosure relates to an electronic device, and in particular, to an electronic device for controlling a connection interface and a method thereof.

2. Description of Related Art

Recently, with the development of digital technologies, various types of electronic devices such as a mobile communication terminal, a Personal Digital Assistant (PDA), an electronic organizer, a smart phone, a tablet Personal Computer (PC), a wearable device, or the like are widely used. In order to support mobility, the electronic device may include a rechargeable battery.

Meanwhile, to achieve a high data transmission rate, there is an effort made to develop an electronic device that transmits or receives a signal on super high frequency (i.e., millimeter Wave (mmWave)) band (e.g., 60 Giga-Hertz (GHz)).

An electronic device may include a connection interface configured to connect a processor and a communication interface. The connection interface may have a plurality of modes supporting different maximum data rates. When a mode of the connection interface does not correspond to a state associated with communication of the electronic device, a problem such as bottleneck, unnecessary power consumption, or the like may occur in the electronic device. Therefore, a method of controlling the mode of the connection interface according to the state associated with the communication may be required in the electronic device.

SUMMARY

Various embodiments of the disclosure provide an electronic device and method for adaptively changing a mode of a connection interface based on a state associated with communication.

Advantageous effects of the present disclosure are not limited to the aforementioned advantageous effects, and other unmentioned advantageous effects can be clearly understood by those skilled in the art from descriptions below.

According to various embodiments, an electronic device may include a housing including a first surface facing a first direction and a second surface facing a second direction opposite the first direction, a touchscreen display exposed through a portion of the first surface, at least one wireless and/or wired communication circuit disposed inside the housing, at least one processor disposed inside the housing and electrically connected to the display and the communication circuit, and a memory positioned inside the housing and electrically connected to the processor. The communication circuit and/or the at least one processor may be configured to be in one of a plurality of states for exchanging data on a bus based on a plurality of generations of a peripheral component interconnect express (PCIe) standard. The plurality of states may include a first state using a first clock and a first data encoding rate based on a first one of the plurality of generations, a second state using a second clock and a second data encoding rate based on a second one of the plurality of generations, and a first recovery state, as defined in the first one of the plurality of generations.

According to various embodiments, an electronic device may include a memory storing instructions, a communication interface for a first communication scheme and a second communication scheme, at least one processor operably coupled to the memory, and a connection interface configured to connect the at least one processor to the communication interface. The at least one processor may be configured to execute the stored instructions to cause the electronic device to detect that the electronic device is connected to another electronic device based on the second communication scheme, to identify a mode of the connection interface based on the detection, and to change a mode of the connection interface from the first mode to a second mode, if the identified mode of the connection interface corresponds to a first mode.

According to various embodiments, a method of an electronic device may include detecting that the electronic device is connected to another electronic device based on a second communication scheme, identifying a mode of the connection interface, based on the detection, and changing a mode of the connection interface from a first mode to the second mode, if the identified mode of the connection interface corresponds to a first mode.

BRIEF DESCRIPTION OF THE DRAWINGS

The above and/or other aspects, features and advantages of various example embodiments of the present disclosure will be apparent from the following detailed description taken in conjunction with the accompanying drawings, in which.

DETAILED DESCRIPTION

Figure 1:
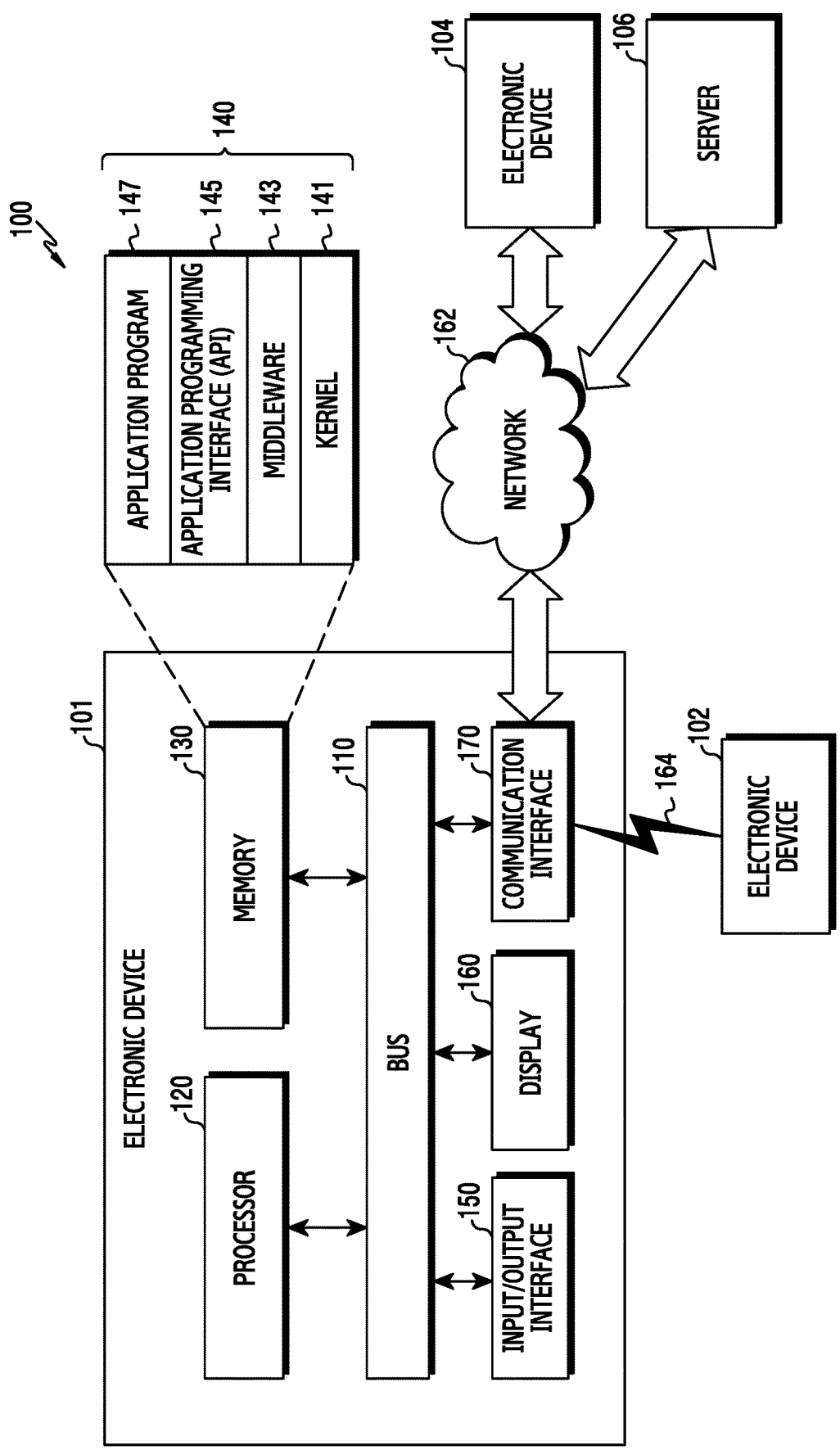
FIG. 1 is a diagram illustrating an example of a network environment including an electronic device according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may use various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. On the other hand, it may be understood that when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer, for example, and without limitation, to a dedicated processor (e.g. embedded processor) for performing the corresponding operations or a generic-purpose processor (e.g., central processing unit (CPU) or application processor (AP)), or the like, that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described in greater detail with reference to the accompanying drawings. As used herein, the term "user" may indicate a person who uses an electronic device or a device (e.g., an artificial intelligence electronic device) that uses an electronic device.

FIG. 1 is a diagram illustrating a network environment including an electronic device according to various embodiments of the present disclosure.

An electronic device 101 within a network environment, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP), or the like. The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
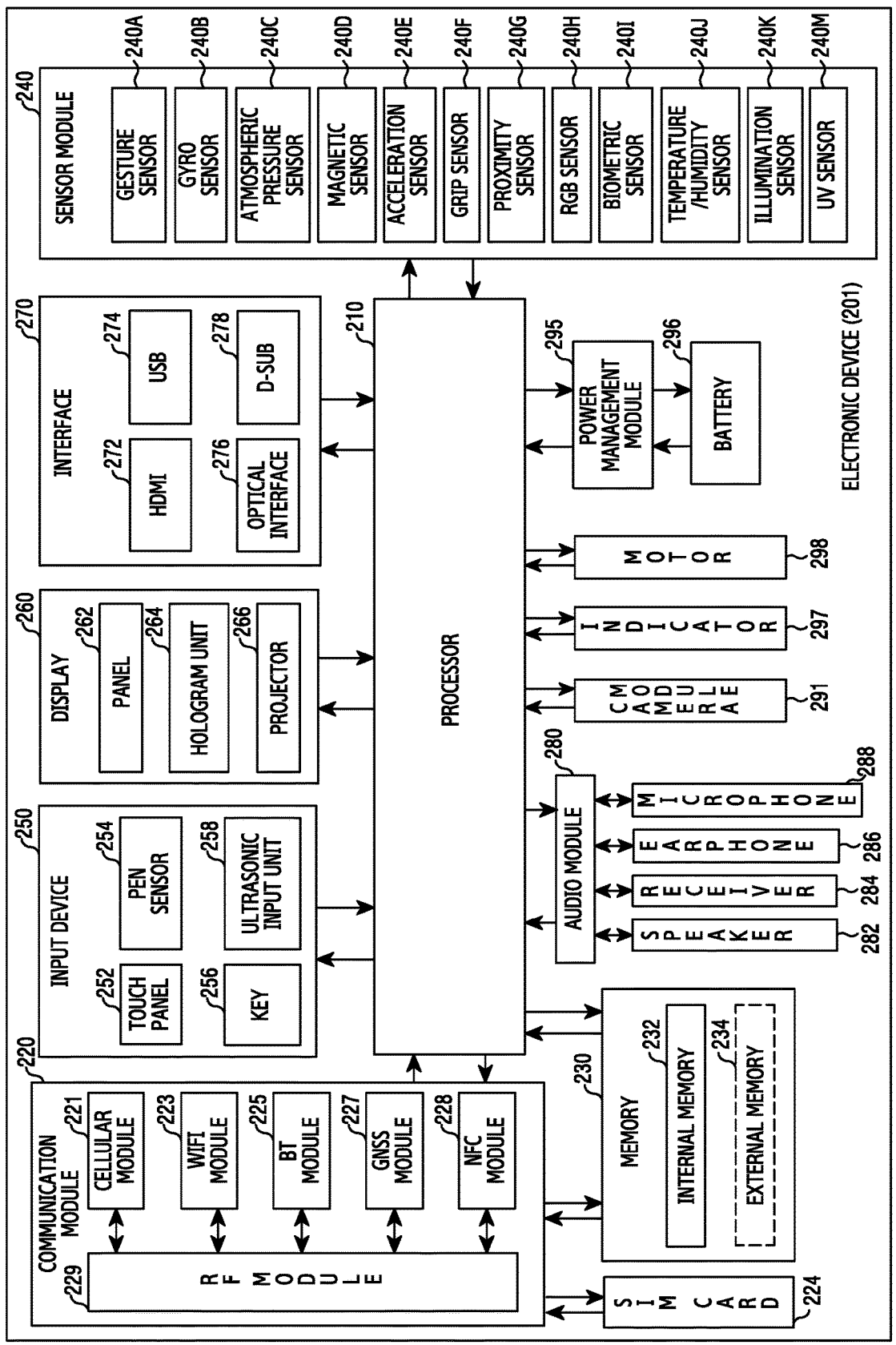
FIG. 2 is a block diagram illustrating an electronic device according to various embodiments.

FIG. 2 is a block diagram illustrating an electronic device according to various embodiments of the present disclosure.

The electronic device 201 may include, for example, all or a part of the electronic device 101 shown in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229, or the like.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illumination sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258, or the like. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278, or the like. The interface 270 may be included in, for example, the communication interface 170 illustrated in FIG. 1. Additionally or alternatively, the interface 270 may include, for example, a Mobile High-definition Link (MHL) interface, a Secure Digital (SD) card/MultiMedia Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO®.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
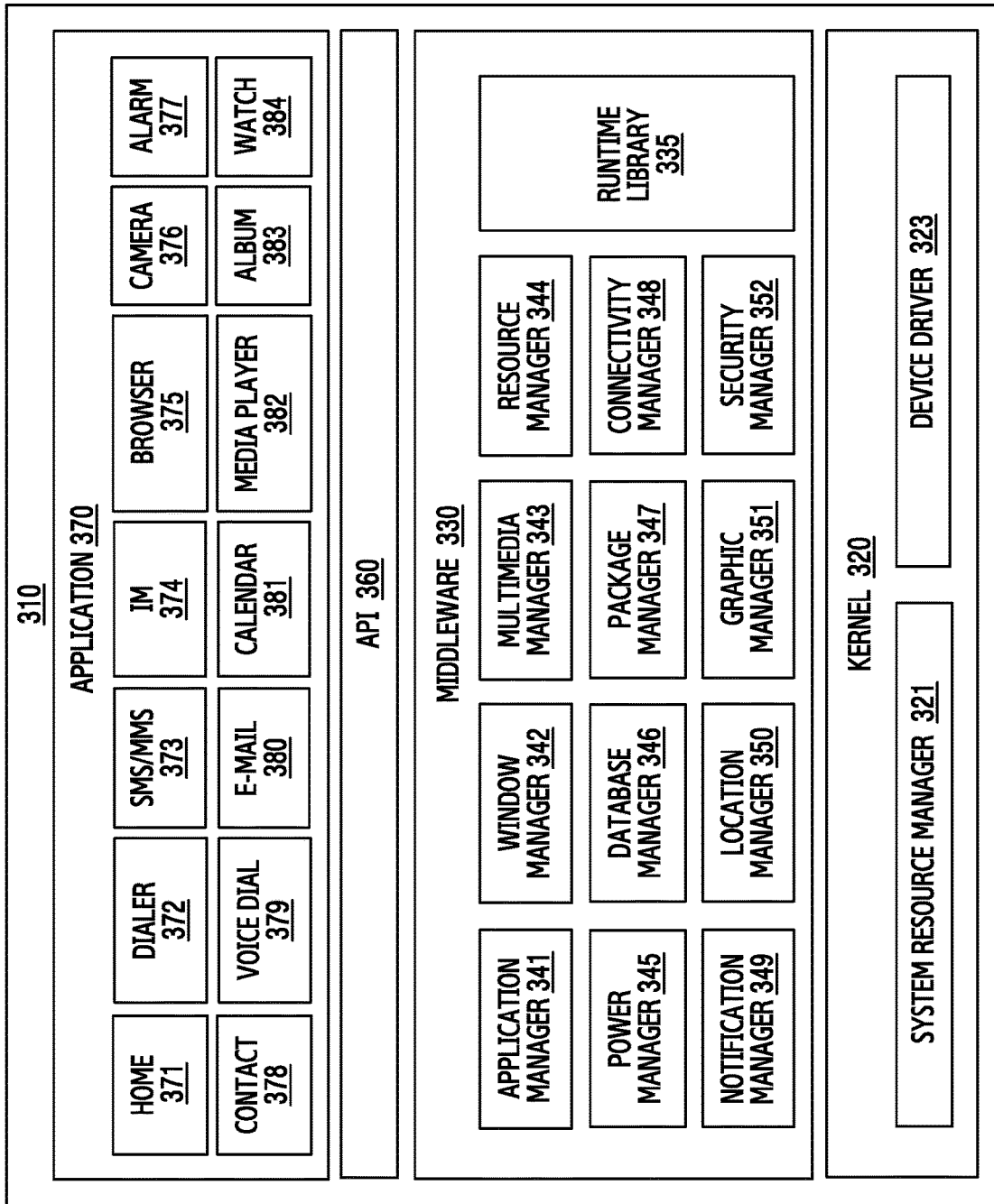
FIG. 3 is a block diagram illustrating a program module according to various embodiments.

FIG. 3 is a block diagram illustrating a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android®, iOS®, Windows®, Symbian®, Tizen®, Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock (watch) 384, or the like. Additionally, though not illustrated, the applications 370 may include additional applications related to, for example, and without limitation, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or any combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a unit of an integrated component element or a part thereof. The "module" may be a unit for performing one or more functions or a part thereof. The "module" may be mechanically or electronically implemented. For example, the "module" according to the present disclosure may include, for example, and without limitation, at least one of a dedicated processor, a CPU, an Application-Specific Integrated Circuit (ASIC) chip, a Field-Programmable Gate Arrays (FPGA), and a programmable-logic device, or the like, for performing operations which has been known or are to be developed hereinafter.

According to various embodiments, at least some of the devices (for example, modules or functions thereof) or the method (for example, operations) according to the present disclosure may be implemented by a command (instructions) stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Figure 4A:
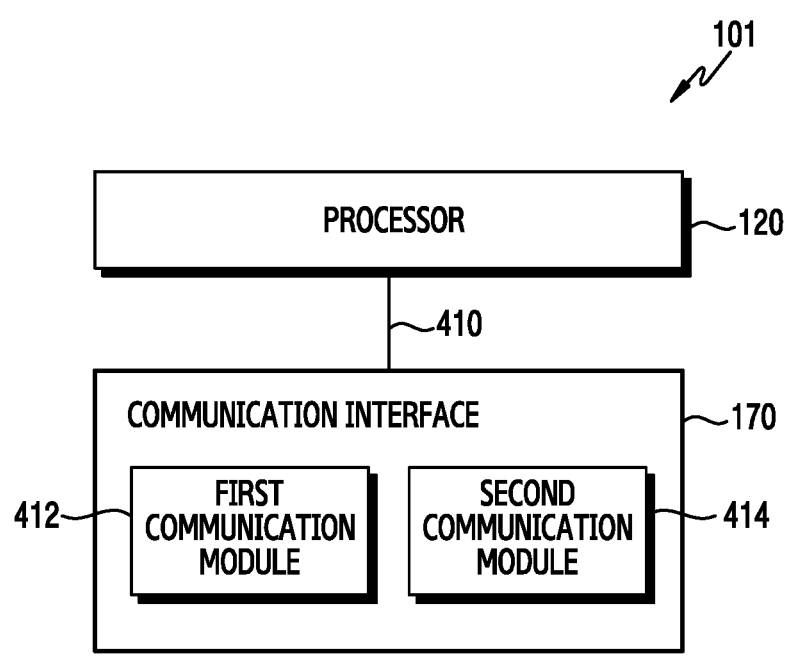
FIG. 4A is a block diagram an example structure of an electronic device according to various embodiments.

FIG. 4A is a block diagram illustrating an example of a functional structure of an electronic device according to various embodiments. Such a structure may, for example, be included in the electronic device 101 of FIG. 1.

Referring to FIG. 4A, the electronic device 101 may include a processor (e.g., including processing circuitry) 120, a communication interface (e.g., including communication circuitry) 170, and a connection interface 410.

The processor 120 may include various processing circuitry and perform various operations for processing a signal received from an external electronic device through the communication interface 170.

In some embodiments, the processor 120 may control the communication interface 170 to transmit the signal to the external electronic device. In an embodiment, in order to transmit the signal, the processor 120 may transmit a signal for controlling at least one filter, at least one amplifier, or the like included in the communication interface 170 to the communication interface 170. In another embodiment, in order to encode, modulate, and up-convert the signal to be transmitted, the processor 120 may transmit a control signal to the communication interface 170. In another embodiment, the processor 120 may produce a transmit beam for improving a transmit gain of the signal. The transmit beam may, for example, be a digital transmit beam produced based on digital signal processing. The transmit beam may, for example, be an analog transmit beam produced based on analog signal processing. The transmit beam may, for example, be a hybrid transmit beam produced based on the digital signal processing and the analog signal processing.

In some embodiments, the processor 120 may control the communication interface 170 to receive a signal transmitted from the external electronic device. For example, in order to receive the signal, the processor 120 may transmit a signal for controlling at least one filter, at least one amplifier, or the like included in the communication interface 170 to the communication interface 170. For another example, in order to down-convert, demodulate, and decode the received signal, the processor 120 may transmit a control signal to the communication interface 170. For another example, the processor 120 may produce a receive beam for improving a receive gain of the signal. The receive beam may, for example, be a digital receive beam produced based on digital signal processing. The receive beam may, for example, be an analog receive beam produced based on analog signal processing. The receive beam may, for example, be a hybrid receive beam produced based on the digital signal processing and the analog signal processing.

The communication interface 170 may include various processing circuitry and perform functions for transmitting or receiving a signal through a radio channel.

The communication interface 170 may include one or more antennas. The one or more antennas may be configured to be suitable for a Multiple Input Multiple Output (MIMO) scheme.

The communication interface 170 may perform a function of conversion between a baseband signal and a bit-stream according to a physical layer standard of a system. For example, in data transmission, the communication interface 170 may produce complex symbols by coding and modulating a transmitted bit-stream. For another example, in data reception, the communication interface 170 may restore a received bit-stream by demodulating and decoding a baseband signal.

The communication interface 170 may up-convert a baseband signal into a Radio Frequency (RF) signal and thereafter transmit it through one or more antennas. The communication interface 170 may down-convert an RF signal received through the one or more antennas into a baseband signal. For example, the communication interface 170 may include a transmission filter, a reception filter, an amplifier, a mixer, an oscillator, a Digital to Analog Convertor (DAC), an Analog to Digital Convertor (ADC), or the like.

The communication interface 170 may include a first communication module (e.g., including communication circuitry) 412 and a second communication module (e.g., including communication circuitry) 414.

The first communication module 412 may include various communication circuitry and be used for a first communication scheme. The first communication scheme may be associated with a first band. For example, the first band may be 2.4 GHz and/or 5 GHz. The first communication scheme may, for example, be a communication scheme for transmitting a signal to a different electronic device using the first band or for receiving the signal from the different electronic device using the first band. For example, the first communication scheme may be Wireless Fidelity (Wi-Fi). The first communication module 412 may, for example, be used to support the standard IEEE 802.11a/b/g/n/ac. In various embodiments, the first communication module 412 may, for example, be used to process a signal transmitted or received on the first band.

The second communication module 414 may include various communication circuitry and be used for a second communication scheme. The second communication scheme may be associated with a second band. For example, the second band may be 60 GHz. The second communication scheme may, for example, be a communication scheme for transmitting a signal to the different electronic device using the second band or for receiving the signal from the different electronic device using the second band. For example, the second communication scheme may be Wireless Gigabit (WiGig). The second communication module 414 may, for example, be used to support the standard IEEE 802.11ad. In various embodiments, the second communication module 414 may be used to process a signal transmitted or received on the second band. For another example, the second communication module 414 may use a transmit beam and/or a receive beam to transmit or receive a signal on the second band.

A bandwidth occupied by the signal transmitted or received based on the second communication scheme may be wider than a bandwidth occupied by a signal transmitted or received based on the first communication scheme. For example, channel capacity (or transmission rate) of the signal transmitted or received based on the second communication scheme may be greater than channel capacity (or transmission rate) of the signal transmitted or received based on the first communication scheme.

In some embodiments, the communication interface 170 may be further used for at least one different communication scheme. The at least one different communication scheme (e.g., a third communication scheme or the like) may be associated with at least one different band (e.g., a third band or the like). In this case, the communication interface 170 may further include at least one different module (e.g., a third communication module or the like) for the at least one different communication scheme.

The processor 120 and the communication interface 170 may be connected through the connection interface 410.

The connection interface 410 may provide the communication interface 170 with a signal received from the processor 120. The communication interface 410 may provide the processor 120 with a signal received from the communication interface 170. In some embodiments, the connection interface 410 may, for example, be an interface according to the Peripheral Component Interconnect express (PCIe) standard.

The connection interface 410 may have various operation modes (e.g., a multi-mode). For example, the operation mode of the connection interface 410 may include a first mode capable of supporting a first maximum data rate and a second mode capable of supporting a second maximum data rate. For another example, the operation mode of the connection interface 410 may include a first mode using a first encoding scheme and a second mode using a second encoding scheme. The connection interface 410 may require a different clock frequency for each operation mode. For example, when the first maximum data rate that can be supported in the first mode is lower than the second maximum data rate that can be supported in the second mode, a first clock frequency for a case where the connection interface 410 operates in the first mode may be lower than a second clock frequency for a case where the connection interface 410 operates in the second mode. Due to a clock frequency difference, power consumption of the connection interface 410 operating in the second mode may be greater than power consumption of the connection interface 410 operating in the first mode.

In some embodiments, the connection interface 410 may further include at least one different mode (e.g., a third mode) for at least one different band (e.g., a third band or the like). For example, the operation mode of the connection interface 410 may be defined as shown in Table 1 below.

TABLE 1

|  | First mode | Second mode | Third mode |
| --- | --- | --- | --- |
| Maximum data rates | 2 Gbps | 4 Gbps | 7.88 Gbps |
| Encoding scheme | 8 b/10 b | 8 b/10 b | 128 b/130 b |
| Clock frequency | 2.5 GHz | 5 GHz | 8 GHz |

In Table 1 above, a maximum data rate of the connection interface 410 operating in the first mode may be 1 Giga bit per second (Gbps), and an encoding scheme used by the connection interface 410 operating in the first mode may be 8b/10b (mapping of 8-bit words to 10-bit-symbols). A clock frequency of the connection interface 410 operating in the first mode may be 2.5 GHz. A maximum data rate of the connection interface 410 operating in the second mode may be 4 Gbps, and an encoding scheme used by the connection interface 410 operating in the second mode may be 8b/10b. A clock frequency of the connection interface 410 operating in the second mode may be 5 GHz. A maximum data rate of the connection interface 410 operating in the third mode may be 7.88 Gbps, and an encoding scheme used by the connection interface 410 may be 128b/130b. A clock frequency of the connection interface 410 operating in the third mode may be 8 GHz.

The operation mode of the connection interface 410 may be determined or changed based on a type of a communication scheme between the electronic device 101 and a different electronic device.

In some embodiments, when the second communication scheme detects that the electronic device is connected to the different electronic device, the connection interface 410 may determine the operation mode to the second mode or may change the operation mode from the first mode to the second mode.

In order to satisfy a transmission rate of the second communication scheme, the connection interface 410 may determine the operation mode as the second mode or may change the operation mode from the first mode to the second mode. For example, it is assumed that a maximum data rate supported by the connection interface 410 is 'a' Gbps when the connection interface 410 operates in the first mode, whereas the maximum data rate supported by the connection interface 410 is 'b' Gbps (where b is greater than a) when the connection interface 410 operates in the second mode. In addition, it is assumed that a transmission rate of the first communication scheme is 'c' Gbps (where c is less than a), whereas a transmission rate of the second communication scheme is 'd' Gbps (where d is greater than a and less than b). In such an environment, the connection interface 410 operating in the first mode can satisfy the transmission rate of the first communication scheme, but cannot satisfy a maximum transmission rate of the second communication scheme. Accordingly, in order to satisfy the transmission rate of the second communication scheme, the connection interface 410 may determine the mode to the second mode or change the mode from the first mode to the second mode.

An operation of detecting that the second communication scheme is used for the connection with the different electronic device may be performed based on various methods. In an embodiment, the detection may be performed by means of the processor 120. For example, the processor 120 may detect that the electronic device 101 and the different electronic device are connected based on the second communication scheme, by distinguishing (or identifying) that a band of a signal transmitted from the electronic device 101 or a signal received by the electronic device 101 is the second band. In another embodiment, the detection may be performed by means of the communication interface 170. For example, the communication interface 170 may detect that the electronic device 101 and the different electronic device are connected based on the second communication scheme, by distinguishing (or identifying) a type of a filter associated with a signal to be transmitted or received. In another embodiment, the detection may be performed by means of the connection interface 410. For example, the connection interface 410 may detect that the electronic device 101 and the different electronic device are connected based on the second communication scheme, by distinguishing (or identifying) a transmission rate of data delivered to the communication interface 170 from the processor 120 through the connection interface 410 (e.g., a data transmission rate or data rate from the processor 120 to the communication interface 170) or a transmission rate of data delivered to the processor 120 from the communication interface 170 through the connection interface 410 (e.g., a data transmission rate or data rate from the communication interface 170 to the processor 120).

The connection interface 410 may determine or change (or convert) the operation mode, based on information associated with communication. The connection interface 410 may determine or change the operation mode, based on the information associated with communication, in order to decrease power consumed in the connection interface 410.

The information associated with communication may be information indicating a communication state of the electronic device 101. The connection interface 410 may determine or change the operation mode, based on whether the information associated with communication satisfies a designated condition.

In some embodiments, the information associated with communication may be information regarding a data rate associated with traffic transmitted or received based on the second communication scheme. For example, when the data rate of the traffic is less than a reference value, the connection interface 410 may determine the operation mode of the connection interface 410 to the first mode or may change the operation mode from the second mode to the first mode. For another example, when the data rate of the traffic is greater than or equal to the reference value, the connection interface 410 may determine the operation mode of the connection interface 410 to the second mode or may change the operation mode from the first mode to the second mode.

In some other embodiments, the information associated with communication may be information regarding a Modulation and Coding Scheme (MCS) value associated with traffic transmitted or received based on the second communication scheme. The MCS value may also be referred to as an MCS level, an MCS index, or the like. For example, when the MCS value of the traffic is less than the reference value, the connection interface 410 may determine the operation mode of the connection interface 410 to the first mode or may change the operation mode from the second mode to the first mode. For another example, when the MCS value of the traffic is greater than or equal to the reference value, the connection interface 410 may determine the operation mode of the connection interface 410 to the second mode or may change the operation mode from the first mode to the second mode.

In some other embodiments, the information associated with communication may be information indicating whether traffic is transmitted or received based on the second communication scheme. For example, when the traffic is not transmitted or received during a designated period, the connection interface 410 may determine the operation mode of the connection interface to the first mode or may change the operation mode from the second mode to the first mode. For another example, when the traffic is transmitted or received during the designated period, the connection interface 410 may determine the operation mode of the connection interface to the second mode or may change the operation mode from the first mode to the second mode.

In some other embodiments, the information associated with communication may be information indicating whether at least one application using communication is executed. For example, when the application requiring the use of the second communication system is not executed in the electronic device 101, the connection interface 410 may determine the operation mode of the connection interface to the first mode or may change the operation mode from the second mode to the first mode. For another example, when the application requiring the use of the second communication scheme is executed in the electronic device 101, the connection interface 410 may determine the operation mode of the connection interface to the second mode or may change the operation mode from the first mode to the second mode.

In some other embodiments, the information associated with communication may be information regarding a movement speed of the electronic device 101. The movement speed of the electronic device 101 may be associated with a communication state of the electronic device 101. When the movement speed of the electronic device 101 is greater than or equal to a designated speed, the electronic device 101 may operate in a state in which the second communication scheme cannot be used due to a difficulty in beam tracking or the like. According to an embodiment, the connection interface 410 may determine or change the operation mode of the connection interface 410, based on the movement speed of the electronic device 101. For example, when the movement speed of the electronic device 101 is greater than the designated speed, the connection interface 410 may determine the operation mode to the first mode or may change the operation mode from the second mode to the first mode. For another example, when the movement speed of the electronic device 101 is less than the designated speed, the connection interface 410 may determine the operation mode to the second mode or may change the operation mode from the first mode to the second mode.

In some other embodiments, the information associated with communication may be information regarding a Quality of Service (QoS) of traffic transmitted or received based on the second communication scheme. For example, when the QoS of the traffic corresponds to a designated QoS, the connection interface 410 may determine the operation mode to the first mode or may change the operation mode from the second mode to the first mode. The designated QoS may indicate a QoS not requiring a data rate greater than or equal to a threshold. In other words, the designated QoS may be a QoS requiring a data rate less than a specific value. For another example, when the QoS of the traffic does not correspond to the designated QoS, the connection interface 410 may determine the operation mode to the second mode or may change the operation mode from the first mode to the second mode.

In some other embodiments, the information associated with communication may be information regarding a battery status of the electronic device 101. In other words, the connection interface 410 may determine or change the operation mode according to a battery remaining amount of the electronic device 101. For example, when a value for indicating the battery status of the electronic device 101 is less than a reference value, the connection interface 410 may determine the operation mode of the connection interface 410 to the first mode or may change the operation mode from the second mode to the first mode. For another example, when the value for indicating the battery status of the electronic device 101 is greater than or equal to the reference value, the connection interface 410 may determine the operation mode of the connection interface 410 to the second mode or may change the operation mode from the first mode to the second mode.

The connection interface 410 may determine or change the operation mode by combining various parameters for indicating a state associated with the communication (e.g., a traffic data rate, an MCS value, information for indicating whether traffic is transmitted/received, information for indicating whether an application is executed, information regarding a movement speed of the electronic device, information regarding a QoS of traffic, a value for indicating a battery status of the electronic device, or the like). In some embodiments, when the various parameters for indicating the state associated with the communication are combined, the electronic device 101 may apply a weight to each of the parameters to be combined. The connection interface 410 may determine or change the operation mode by combining the parameters to which the weight is applied.

The determining or changing of the operation mode of the connection interface 410 may be triggered based on various methods. For example, the determining or changing of the operation mode of the connection interface 410 may be triggered by a control signal delivered from the processor 120 to the connection interface 410. For another example, the determining or changing of the operation mode of the connection interface 410 may be triggered by a control signal delivered from the communication interface 170 to the connection interface 410. For another example, the determining or changing of the operation mode of the connection interface 410 may be triggered by the determination of the connection interface 410.

Although two operation modes of the connection interface 410 are illustrated by way of example in FIG. 4A, this is only for convenience of explanation. The operation mode of the connection interface 410 may be further divided according to a transmission rate of communication between the electronic device 101 and the different electronic device. For example, the connection interface 410 may operate in a first mode to support a first maximum transmission rate, may operate in a second mode to support a second maximum transmission rate higher than the first maximum transmission rate, and may operate in a third mode to support a third maximum transmission rate higher than the second maximum transmission rate.

As described above, the electronic device 101 according to various embodiments may adaptively determine or change the mode of the connection interface 410 to connect the processor 120 and the communication interface 170, based on the information associated with communication or a type of a communication scheme used for the connection with the different electronic device. The electronic device 101 according to various embodiments may decrease power consumption of the electronic device 101 by adaptively determining or changing the mode of the connection interface 410. In addition, communication can be effectively performed according to the type of the communication scheme used by the electronic device 101 by adaptively determining or changing the mode of the connection interface 410.

Figure 4B:
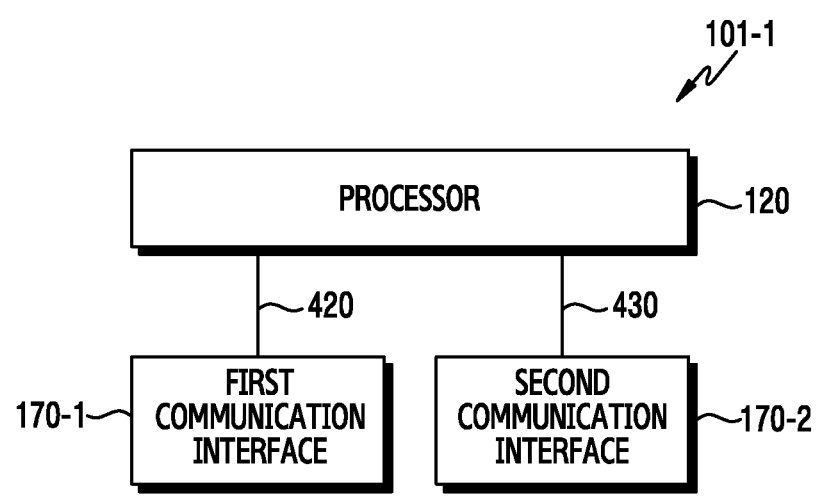
FIG. 4B is a block diagram illustrating another example structure of an electronic device according to various embodiments.

FIG. 4B is a block diagram illustrating another example of a functional structure of an electronic device according to various embodiments.

Referring to FIG. 4B, an electronic device 101-1 may include a first communication interface (e.g., including communication circuitry) 170-1, a second communication interface (e.g., including communication circuitry) 170-2, a first connection interface 420, and a second connection interface 430.

The processor 120 may correspond to the processor 120 of FIG. 4A.

Unlike in the electronic device 101 of FIG. 4A, the electronic device 101-1 of FIG. 4B may include an independent communication interface for each band.

The first communication interface 170-1 may include various communication circuitry and be a communication interface for a first communication scheme. In various embodiments, the first communication interface 170-1 may perform a process for transmitting or receiving a signal on a first band. For example, the first communication interface 170-1 may be used to support the standard 802.11 a/b/g/n/ac.

The second communication interface 170-2 may include various communication circuitry and be a communication interface for a second communication scheme. In various embodiments, the second communication interface 170-2 may perform a process for transmitting or receiving a signal on a second band. For example, the second communication interface 170-2 may be used to support the standard 802.11 ad.

The first connection interface 420 may connect the processor 120 and the first communication interface 170-1. Since the first communication interface 170-1 is associated with the first communication scheme, the first connection interface 420 may operate in a first mode. In some embodiments, the first connection interface 420 may be a peripheral Component Interconnect express (PCIe).

The second connection interface 430 may connect the processor 120 and the second communication interface 170-2. Since the second communication interface 170-2 is associated with the second communication scheme, the second connection interface 430 may operate in a multi-mode. For example, the second connection interface 430 may operate in the first mode, and may operate in the second mode. In some embodiments, the second connection interface 430 may be a peripheral Component Interconnect express (PCIe).

The second connection interface 430 may determine or change the operation mode according to a state associated with communication. For example, the second connection interface 430 may correspond to the connection interface 410 of FIG. 4A.

As described above, the electronic device 101-1 according to various embodiments may include a plurality of communication interfaces independent for each communication scheme. The electronic device 101-1 may determine or change a mode of the connection interface for connecting some of the plurality of communication interfaces and the processor 120 according to the information associated with communication or a type of the communication scheme used for the connection between the electronic device 101-1 and the different electronic device. The electronic device 101-1 may decrease power consumption of the electronic device 101-1 by determining or changing the mode of the connection interface. In addition, communication can be effectively performed irrespective of the type of the communication scheme used by the electronic device 101-1 by determining or changing the mode of the connection interface.

Figure 5:
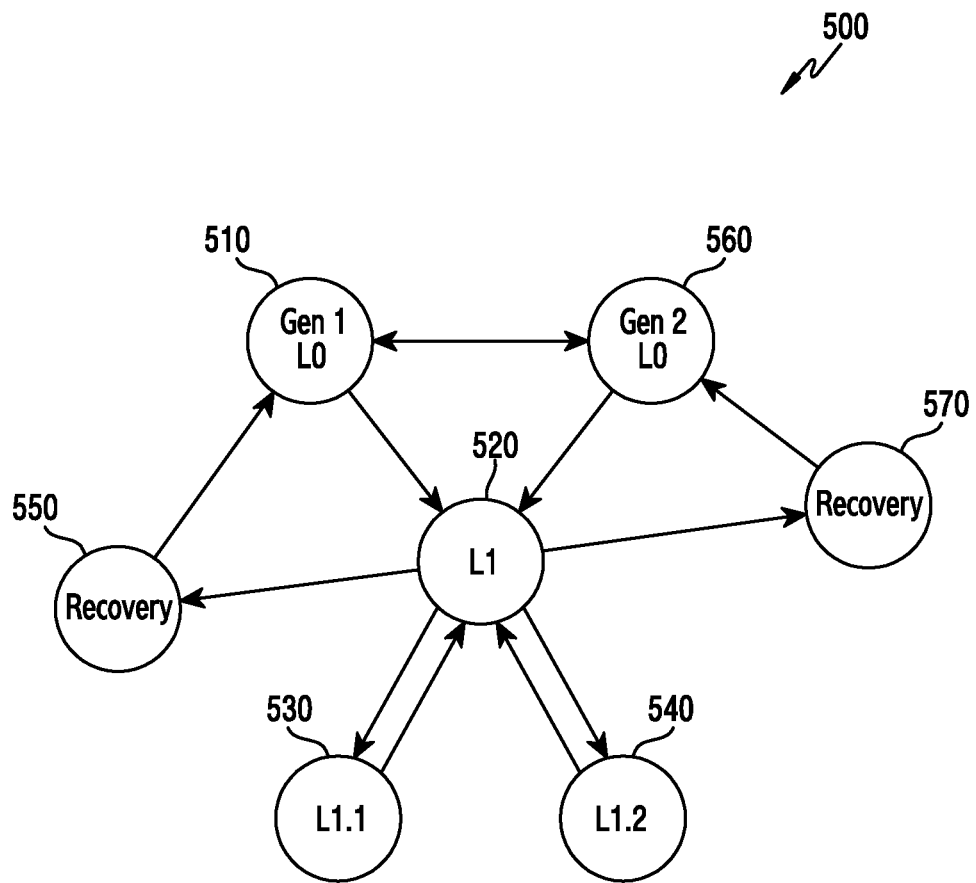
FIG. 5 is a diagram illustrating an example of a multi-state of a connection interface according to various embodiments.

FIG. 5 is a diagram illustrating an example of a multi-state of a connection interface according to various embodiments. Such a generation may be applied to the connection interface 410 of FIG. 4A, the first connection interface 420 of FIG. 4B, and the second connection interface 430 of FIG. 4B.

In addition, it should be noted that the term referred to as a "generation" in FIG. 5 and in the present document may, for example, and without limitation, also be referred to as a "mode" or a "sub mode".

Referring to FIG. 5, a multi-state 500 of a connection interface according to various embodiments may include a generation 1 L0 state 510.

The generation 1 L0 state 510 according to various embodiments may be a state in which the connection interface delivers data to at least one constitutional element in the electronic device 101. The generation 1 L0 state 510 may be an active state. The generation 1 L0 state 510 may have a first maximum data rate. The generation 1 L0 state 510 may be referred to as an L0 state (or a link state 0) (e.g., an L0 state of the PCIe standard) in the generation 1. The connection interface operating in the generation 1 L0 state 510 may provide the communication interface with a signal or data received from a processor (e.g., the processor 120). In addition, the connection interface operating in the generation 1 L0 state 510 may provide the processor with the signal or data received from the communication interface.

In the absence of a signal or data delivered to the processor through the connection interface or delivered to the communication interface through the connection interface during a designated period, the connection interface may change a state of the connection interface from the generation 1 L0 state 510 to an L1 state 520. For example, when the connection interface is not used during the designated time, the connection interface may change the state of the connection interface from the generation 1 L0 state 510 to the L1 state 520 to decrease power consumed in the connection interface.

The L1 state 520 according to various embodiments may be a standby state, an idle state, or a sleep state. The connection interface operating in the L1 state 520 may operate in the standby state (e.g., an L1 state of the PCIe standard) instead of delivering the signal or data to the processor or the communication interface. The L1 state 520 may be used to decrease power consumption of the connection interface.

The connection interface operating in the L1 state 520 according to various embodiments may operate in a state in which a Phase Locked Loop (PLL) associated with the connection interface is activated, a transceiver of the connection interface for transmitting or receiving data or a signal is deactivated, or a common-mode keeper of the connection interface for monitoring a state of the connection interface is activated.

Upon requesting for the change of the state of the connection interface from the L1 state 520 to another state (e.g., the generation 1 L0 state 510), the state of the connection interface may be changed from the generation 1 L0 state 510 to another state via an intermediate state. The intermediate state may be a first recovery state 550 or a second recovery state 570.

The first recovery state 550 or the second recovery state 570 may be a state for activating a constitutional element (e.g., a transceiver, a PLL, etc.) in the connection interface deactivated in the L1 state 520. For example, the first recovery state 550, the second recovery state 570, or the like may indicate an operation of the connection interface during a time required for a state change (or a mode change) of the connection interface.

For example, upon requesting for the change of the state of the connection interface from the L1 state 520 to the generation 1 L0 state 510, the state of the connection interface may be changed from the L1 state 520 to the generation 1 L0 state 510 via the first recovery state 550. A delay time (or a target delay time) required to change the state of the connection interface operating in the L1 state 520 to the generation 1 L0 state 510 via the first recovery state 550 may be 5 microseconds (p).

For another example, upon requesting for the change of the state of the connection interface from the L1 state 520 to a generation 2 L0 state 560, the state of the connection interface may be changed from the L1 state 520 to the generation 2 L0 state 560 via the second recovery state 570.

Although it is exemplified in FIG. 5 that the connection interface has two recovery states (e.g., the first recovery state 550, the second recovery state 570), this is for exemplary purposes only. The connection interface according to various embodiments may have a plurality of recovery states. For example, the connection interface may have one recovery state which is not independent for each generation.

The generation 2 L0 state 560 according to various embodiments may be a state in which the connection interface operates normally. For example, the generation 2 L0 state 560 may be an active state. The generation 2 L0 state 560 may have a second maximum data rate higher than the first maximum data rate. For example, the generation 2 L0 state 560 may have higher transmission performance than the generation 1 L0 state 510. In addition, since the generation 2 L0 state 560 provides higher performance than the generation 1 L0 state 510, power consumption of the connection interface operating in the generation 2 L0 state 560 may be greater than power consumption of the connection interface operating in the generation 1 L0 state 510. The connection interface operating in the generation 2 L0 state 560 may deliver a signal or data to the processor or the communication interface at a faster speed than the generation 1 L0 state 510.

In the absence of the signal or data delivered to the processor through the connection interface or delivered to the communication interface through the connection interface for a designated period, the connection interface may change the state of the connection interface from the generation 2 L0 state 560 to the L1 state 520. For example, when the connection interface is not used during a specific time, the connection interface may change the state of the connection interface from the generation 2 L0 state 560 to the L1 state 520 to decrease power consumed in the connection interface.

Meanwhile, in some embodiments, the L1 state 520 may include a plurality of sub-states. For example, the L1 state 520 may include an L1.1 state 530 and an L1.2 state 540.

The L1.1 state 530 and the L1.2 state 540 may be a state for more decreasing power consumed in the connection interface than in the L1 state 520.

The connection interface operating in the L1.1 state 530 may operate in a state in which the PLL is deactivated, the transceiver is deactivated, and the common-mode keeper is activated. The connection interface may change the state of the connection interface from the L1 state 520 to the L1.1 state 530 or from the L1.1 state 530 to the L1 state 520 according to the presence/absence of traffic associated with the connection interface.

The connection interface operating in the L1.2 state 540 may operate in a state in which the PLL is deactivated, the transceiver is deactivated, and the common-mode keeper is deactivated. The connection interface may change the state of the connection interface from the L1 state 520 to the L1.2 state 540 or from the L1.2 state 540 to the L1 state 520 according to the presence/absence of traffic associated with the connection interface.

FIG. 5 illustrates an example in which the connection interface has two active states (i.e., the generation 1 L0 state 510 and the generation 2 L0 state 560). However, this is only for convenience of explanation, and it should be noted that the connection interface may have more activate states. For example, the connection interface may further include a generation 3 L0 state. When the generation-3 L0 state is further provided, in addition to the generation 3 L0 state, the state of the connection interface may further include a recovery state as an intermediary state for changing from the L1 state 520 to the generation 3 L0 state, and may not include the recovery state.

As described above, the connection interface according to various embodiments includes various active states, thereby providing effective communication and decreasing power consumed in the connection interface.

As described above, according to various embodiments, an electronic device (e.g., the electronic device 101 of FIG. 1) may include a housing including a first surface facing a first direction and a second surface facing a second direction opposite the first direction, a touchscreen display (e.g., the display 160 of FIG. 1) exposed through a portion of the first surface, at least one wireless and/or wired communication circuit (e.g., the communication interface 170 of FIG. 1) disposed inside the housing, at least one processor (e.g., the processor 120 of FIG. 1) disposed inside the housing and electrically connected to the display and the communication circuit, and a memory (e.g., the memory 120 of FIG. 1) disposed inside the housing and electrically connected to the processor. The communication circuit and/or the at least one processor may be configured to be in one of a plurality of states for exchanging data on a bus, based on a plurality of generations of a peripheral component interconnect express (PCIe) standard. The plurality of states may include a first state using a first clock and a first data encoding rate based on a first one of the plurality of generations, a second state using a second clock and a second data encoding rate based on a second one of the plurality of generations, and a first recovery state, as defined in the first one of the plurality of generations.

In some embodiments, the plurality of states may further include a second recovery state, not defined in the first one of the plurality of generations.

In some embodiments, the plurality of states may further include a third state for standby, as defined in the first one of the plurality of generations. In an embodiment, the plurality of states may further include a fourth state in which a phase locked loop (PLL) associated with the bus and a transceiver associated with the bus are turned off. In another embodiment, the plurality of states may further include a fifth state in which a common mode keeper associated with the bus is turned off 6. For example, the first state may be L0 state, as defined by Generation 1 of the PCIe standard. For another example, the third state may be L1 state, as defined by Generation 1 of the PCIe standard. For another example, the fourth state may be L1.1 state, and the fifth state may be L1.2 state as defined by Generation 1 of the PCIe standard.

In some embodiments, the communication circuit and/or the at least one processor may be configured to switch from the first state to the second state or vice versa, based on one or more of: an amount of data, a type of communication protocol, power consumption, battery status, and/or a quality of service (QoS) of data.

As described above, according to various embodiments, an electronic device (e.g., the electronic device 101) may include a memory (e.g., the memory 130) storing instructions, a communication interface comprising communication circuitry (e.g., the communication interface 170) for a first communication scheme and a second communication scheme, at least one processor (e.g., the processor 120) operably coupled to the memory, and a connection interface configured to connect the at least one processor to the communication interface. The at least one processor may be configured to execute the stored instructions to cause the electronic device to detect that the electronic device is connected to another electronic device based on the second communication scheme, to identify a mode of the connection interface based on the detection, and change a mode of the connection interface from the first mode to a second mode, if the identified mode of the connection interface corresponds to a first mode.

In some embodiments, a band associated with the second communication scheme may be higher than a band associated with the first communication scheme, and a maximum data rate that is supported by the connection interface operating in the second mode may be higher than a maximum data rate that is supported by the connection interface operating in the first mode.

In some embodiments, the at least one processor may be configured to execute the stored instructions to cause the electronic device to identify information associated with a communication that the connection interface operates in the second mode, and to change a mode of the connection interface from the second mode to the first mode, if the information associated with the communication satisfies a designated condition.

In an embodiment, the information may include information regarding modulation and coding scheme (MCS) value associated with a traffic that is transmitted or received based on the second communication scheme, and the at least one processor may be configured to execute the stored instructions to cause the electronic device to change a mode of the connection interface from the second mode to the first mode, if the MCS value is less than a reference value.

In another embodiment, the information may include information regarding a data rate of a traffic that is transmitted or received based on the second communication scheme, and the at least one processor may be configured to cause the electronic device to execute the stored instructions to change a mode of the connection interface from the second mode to a first mode, if the data rate is less than a reference value.

In another embodiment, the information may include information regarding whether a traffic is transmitted or received based on the second communication scheme, and the at least one processor may be configured to execute the stored instructions to cause the electronic device to change a mode of the connection interface from the second mode to the first mode, if the traffic is transmitted or received based on the second communication scheme during a pre-determined period.

In another embodiment, the information may include information regarding at least one application being executed in the electronic device, and the at least one processor may be configured to execute the stored instructions to cause the electronic device to change a mode of the connection interface from the second mode to the first mode, if a type of the at least one processor is a designated type.

In another embodiment, the information may include information regarding a movement speed of the electronic device, and the at least one processor may be configured to execute the stored instructions to cause the electronic device to change a mode of the connection interface from the second mode to the first mode, if the movement speed is higher than or equal to a designated speed.

In another embodiment, the information may include information regarding a quality of service (QoS) of a traffic transmitted or received based on the second communication scheme, and the at least one processor may be configured to execute the stored instructions to cause the electronic device to change a mode of the connection interface from the second mode to the first mode, if the QoS corresponds to a designated QoS.

In another embodiment, the information may include information regarding a value for indicating a state of a battery of the electronic device, and the at least one processor may be configured to execute the stored instructions to cause the electronic device to change a mode of the connection interface from the second mode to the first mode, if the value for indicating the state of the battery is less than a reference value.

Figure 6A:
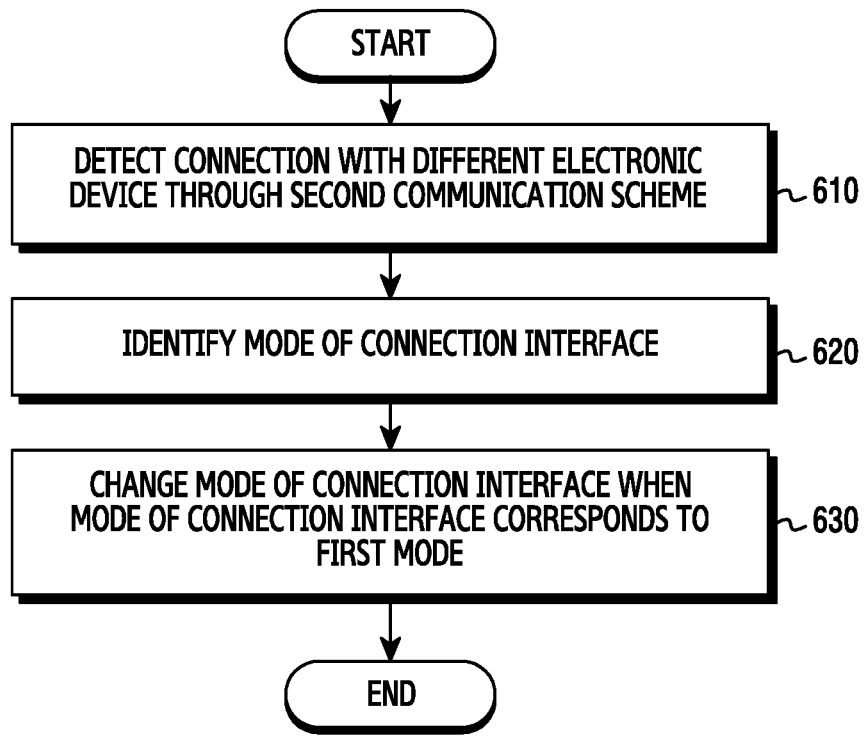
FIG. 6A is a flowchart illustrating an example of an operation of an electronic device according to various embodiments.

FIG. 6A is a flowchart illustrating an example of an operation of an electronic device according to various embodiments. Such an operation may be performed by the electronic device 101 and/or at least one element (e.g., the processor 120, the communication interface 170, etc.) included in the electronic device 101.

In FIG. 6A, the electronic device 101 may identify a mode of the connection interface upon detecting that the electronic device and a different electronic device are connected through the second communication scheme, and when the identified mode of the connection interface is a first mode, may change the mode of the connection interface to a second mode.

Referring to FIG. 6A, in operation 610, the electronic device (e.g., the electronic device 101 of FIG. 1) may detect that the electronic device is connected to the different electronic device through the second communication scheme between the first communication scheme and the second communication scheme. For example, the processor 120 may detect that the electronic device is connected to the different electronic device through the second communication scheme between the first communication scheme and the second communication scheme. For example, the electronic device 101 may detect which communication scheme is used to establish the connection with the different electronic device, in order to provide a transmission speed of a connection interface corresponding to a transmission speed of traffic exchanged between the electronic device 101 and the different electronic device.

In operation 620, the electronic device 101 may identify (or distinguish) the mode of the connection interface between the processor 120 and the communication interface 170. For example, the processor 120 may identify the mode of the connection interface. For example, the connection interface may have a multi-mode as shown in FIG. 5. The electronic device 101 may distinguish a current mode of the connection interface so that the connection interface can have a transmission speed conforming to a transmission speed of the second communication scheme.

Although operation 620 of FIG. 6A is illustrated by way of example as an operation of identifying the mode of the connection interface upon detecting that the electronic device 101 is connected to the different electronic device through the second communication scheme, it should be noted that operation 620 of FIG. 6A may be associated with another operation according to various embodiments. In some embodiments, the electronic device 101 may identify the mode of the connection interface upon activating of a function for the second communication scheme. For example, the electronic device 101 may identify the mode of the connection interface upon activating of the function for the second communication scheme, irrespective of whether the connection with the different electronic device is established through the second communication scheme.

In operation 630, when the mode of the connection interface corresponds to the first mode, the electronic device 101 may change the mode of the connection interface from the first mode to the second mode. When the mode of the connection interface corresponds to the first mode, the processor 120 may change the mode of the connection interface from the first mode to the second mode. For example, the first mode may be a generation 1 L0 state of the PCIe standard, and the second mode may be the generation 2 L0 state of the PCIe standard. In various embodiments, the electronic device 101 may change the mode of the connection interface from the first mode to the second mode, in order to satisfy a transmission speed based on the second communication scheme. Although not shown in FIG. 6A, when the mode of the connection interface corresponds to the second mode, the electronic device 101 may maintain the mode of the connection interface to the second mode. In other words, the electronic device 101 may adaptively determine the mode of the connection interface according to a type of the connection between the electronic device 101 and the different electronic device.

Figure 6B:
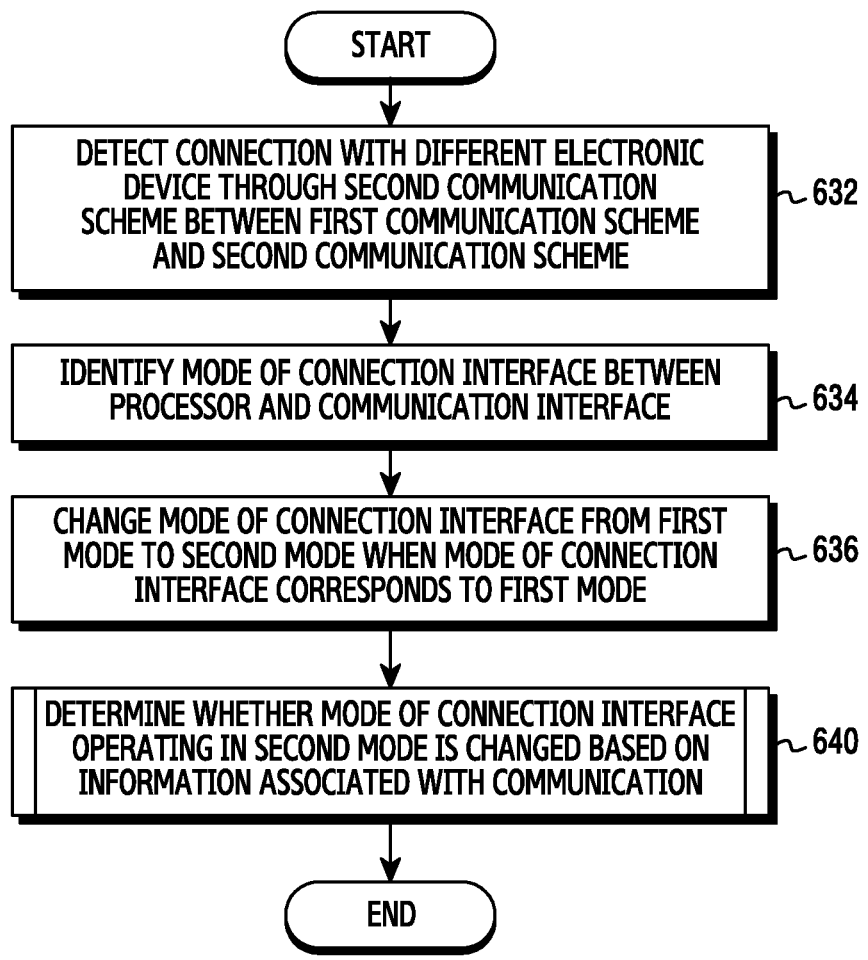
FIG. 6B is a flowchart illustrating an example of another operation of an electronic device according to various embodiments.

FIG. 6B is a flowchart illustrating an example of another operation of an electronic device according to various embodiments. Such an operation may be performed by the electronic device 101 or at least one element (e.g., the processor 120, the communication interface 170, etc.) included in the electronic device 101.

In FIG. 6B, the electronic device 101 may change the mode of the connection interface to the second mode, and thereafter may determine whether the mode of the connection mode operating in the second mode is changed based on information associated with communication.

Referring to FIG. 6B, since operations 632, 634, and 636 may respectively correspond to operations 610, 620, and 630, detailed descriptions on operations 632, 634, and 636 correspond with descriptions on operations 610, 620, and 630 above and will not be repeated here.

In operation 640, the electronic device 101 may determine whether the mode of the connection interface operating in the second mode is changed based on the information associated with communication. For example, the processor 120 may determine whether the mode of the connection interface operating in the second mode is changed based on the information associated with communication. In some embodiments, in order to save power consumed in the connection interface, the electronic device 101 may determine whether the mode of the connection interface operating in the second mode is changed based on the information associated with communication.

For example, even if a connection is established with the different electronic device through the second communication scheme, the electronic device 101 may not use the connection, or may not use all capabilities of the connection. In this case, maintaining of the mode of the connection interface to the second mode may result in power consumption. Therefore, the electronic device 101 may monitor the information associated with communication when the connection interface operates in the second mode.

The information associated with communication may include information regarding various parameters for representing a state associated with communication.

In some embodiments, the information associated with communication may include information regarding various parameters for representing a communication state associated with the second communication scheme. For example, the information associated with communication may include one or more of information regarding a Modulation and Coding Scheme (MCS) value associated with traffic transmitted or received based on the second communication scheme, information regarding a data rate associated with the traffic transmitted or received based on the second communication scheme, information for indicating whether the traffic is transmitted/received based on the second communication scheme, and information regarding a QoS of the traffic transmitted or received based on the second communication scheme. The electronic device 101 may determine whether the mode of the connection interface is changed from the second mode to the first mode, based at least in part on the information associated with communication. For example, when at least a portion of the information associated with communication corresponds to a designated condition, the electronic device 101 may change the mode of the connection interface from the second mode to the first mode. For another example, when the at least the portion of the information associated with communication does not correspond to the designated condition, the electronic device 101 may maintain the mode of the connection interface to the second mode.

In some other embodiments, the information associated with communication may include information for indicating the electronic device's state associated with communication. For example, the information associated with communication may include information regarding at least one application being executed in the electronic device 101. For example, when the application being executed in the electronic device 101 is not an application associated with communication (or when it is not an application using the second communication scheme), the electronic device 101 may distinguish that a probability of using the second communication scheme by the electronic device 101 is low even if it is a state of being connected to the different electronic device through the second communication scheme. Therefore, the information associated with communication may include information regarding at least one application being executed in the electronic device 101.

In addition, in some other embodiments, the information associated with communication may further include information regarding a movement speed of the electronic device 101. For example, when the electronic device 101 moves at a high speed, the electronic device 101 may communicate with the different electronic device in a state in which it is difficult to track the electronic device 101 through a beam used for the second communication scheme. In this case, traffic transmission/reception through the second communication scheme may be significantly lower than a target value of the second communication scheme. In other words, even if the electronic device 101 and the different electronic device are connected based on the second communication scheme, a transmission rate of traffic exchanged by the electronic device 101 and the different electronic device may correspond to a transmission rate of the connection interface operating in the first mode. Therefore, the information associated with communication may further include information regarding the movement speed of the electronic device 101. The movement speed of the electronic device 101 may be detected or measured through a sensor module in the electronic device 101 or through a communication module in the electronic device 101.

In addition, in some other embodiments, the information associated with communication may further include information for indicating a battery status of the electronic device 101. For example, when a battery remaining amount of the electronic device 101 is less than a threshold, the electronic device 101 may decrease capability associated with communication of the electronic device 101, in order to prevent the electronic device 101 from operating in a low-power state, an off state, or a sleep state. In this case, the electronic device 101 may not transmit traffic at a speed conforming to performance of the second communication scheme even in a state of being connected to the different electronic device, based on the second communication scheme. Therefore, the information associated with communication may further include information for indicating the battery status of the electronic device 101.

The electronic device 101 may determine whether the mode of the connection interface is changed from the second mode to the first mode, based on at least a portion of information for indicating the electronic device's state associated with communication. For example, if the at least the portion of the information for indicating the electronic device's state associated with communication corresponds to a designated condition, the electronic device 101 may change the mode of the connection interface from the second mode to the first mode. For another example, if the at least the portion of the information for indicating the electronic device's state associated with communication does not correspond to the designated condition, the electronic device 101 may maintain the mode of the connection interface to the second mode.

In operation 640, the electronic device 101 may determine whether the mode of the connection interface is changed, and may perform communication with the different electronic device, based on the determined mode. For example, the processor 120 may determine whether the mode of the connection interface is changed, and may perform communication with the different electronic device, based on the determined mode.

Operation 640 will be described in greater detail below with reference to FIG. 8 to FIG. 16 or the like.

As described above, when the electronic device 101 is connected to the different electronic device, the electronic device 101 according to various embodiments may monitor (or detect) a connection scheme with respect to the different electronic device, thereby controlling the connection interface to operate in a mode corresponding to the connection scheme. In addition, when the connection interface operates in the second mode, the electronic device 101 may monitor whether the information associated with communication satisfies the designated condition periodically or on a real-time basis, thereby decreasing power consumed in the connection interface.

Figure 7:
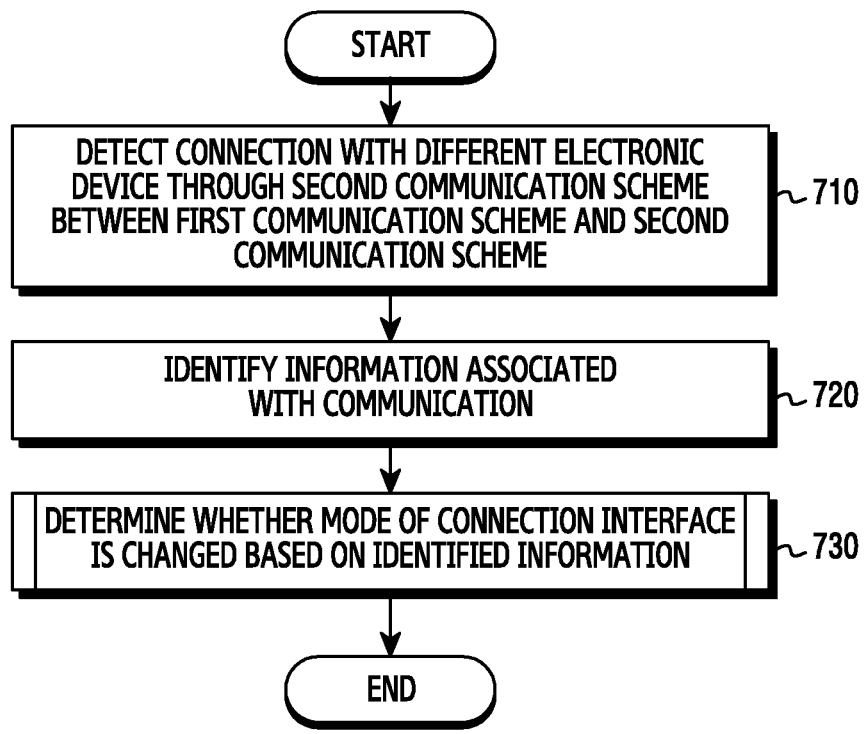
FIG. 7 is a flowchart illustrating another example of an operation of an electronic device according to various embodiments.

FIG. 7 is a flowchart illustrating another example of an operation of an electronic device according to various embodiments. Such an operation may be performed by the electronic device 101 or at least one element (e.g., the processor 120, the communication interface 170, etc.) included in the electronic device 101.

In FIG. 7, the electronic device 101 may identify the information associated with communication, based at least in part on detecting that the electronic device is connected to the different electronic device through the second communication scheme between the first communication scheme and the second communication scheme and activating a function for the second communication scheme, and may determine whether the mode of the connection interface is changed based at least in part on the identified information associated with communication.

Referring to FIG. 7, in operation 710, the electronic device 101 may detect that it is connected to the different electronic device through the second commination scheme between the first communication scheme and the second communication scheme. For example, the processor 120 may detect that the electronic device 101 is connected to the different electronic device through the second communication scheme between the first communication scheme and the second communication scheme. Operation 710 may correspond to operation 610 of FIG. 6A.

In operation 720, the electronic device 101 may identify (determine) or distinguish the information associated with communication. For example, the processor 120 may identify or distinguish the information associated with communication. The electronic device 101 may identify or distinguish the information associated with communication, based on detecting that the electronic device is connected to the different electronic device through the second communication scheme. The electronic device 101 may identify the information associated with communication, in order to determine the mode of the connection interface or to determine whether the mode of the connection interface is changed. The information associated with communication may include, for example, one or more of information regarding an MCS value associated with traffic transmitted or received based on the second communication scheme, information regarding a data rate associated with the traffic transmitted or received based on the second communication scheme, information for indicating whether the traffic is transmitted/received based on the second communication scheme, information regarding a QoS of the traffic transmitted or received based on the second communication scheme, information regarding at least one application being executed in the electronic device 101, information regarding a movement speed of the electronic device 101, and information for indicating a battery status of the electronic device 101.

In operation 730, the electronic device 101 may determine the mode of the connection mode or may determine whether the mode of the connection interface is changed, based on the identified information. For example, the processor 120 may determine the mode of the connection interface or may determine whether the mode of the connection interface is changed, based on the identified information. For example, if at least a portion of the identified information satisfies a designated condition, the electronic device 101 may change the mode of the connection interface. For another example, if the at least the portion of the identified information does not satisfy the designated condition, the electronic device 101 may maintain the mode of the connection interface to a current mode.

In operation 730, the electronic device 101 may determine whether the mode of the connection interface is changed and may perform communication with the different electronic device, based on the determined mode.

Operation 730 will be described below in greater detail with reference to FIG. 8 to FIG. 16 or the like.

As described above, the electronic device 101 according to various embodiments may identify the information associated with communication upon detecting that the electronic device 101 is connected to the different electronic device through the second communication scheme, and may determine the mode of the connection interface or determine whether the mode of the connection interface is changed, based on the identified information. For this operation, the electronic device 101 may control the connection interface to operate in a mode having a transmission rate corresponding to a transmission rate of traffic transmitted/received based on the second communication scheme, and may save power consumed in the connection interface.

Meanwhile, in some embodiments, the electronic device 101 may perform the operation of FIG. 6A or FIG. 6B or the operation of FIG. 7 by changing the operation adaptively in response to a state of the electronic device 101. In some embodiments, when a high transmission efficiency is required, the electronic device 101 may perform the operation of FIG. 6A or FIG. 6B to achieve a fast response speed. Unlike this, when it is required to decrease power consumption, the electronic device 101 may perform the operation of FIG. 7 to decrease power consumption. For example, the electronic device 101 may perform the operation of FIG. 6A or FIG. 6B when a battery remaining amount of the electronic device 101 is greater than or equal to a threshold, and may perform the operation of FIG. 7 when the battery remaining amount of the electronic device 101 is less than the threshold.

Figure 8:
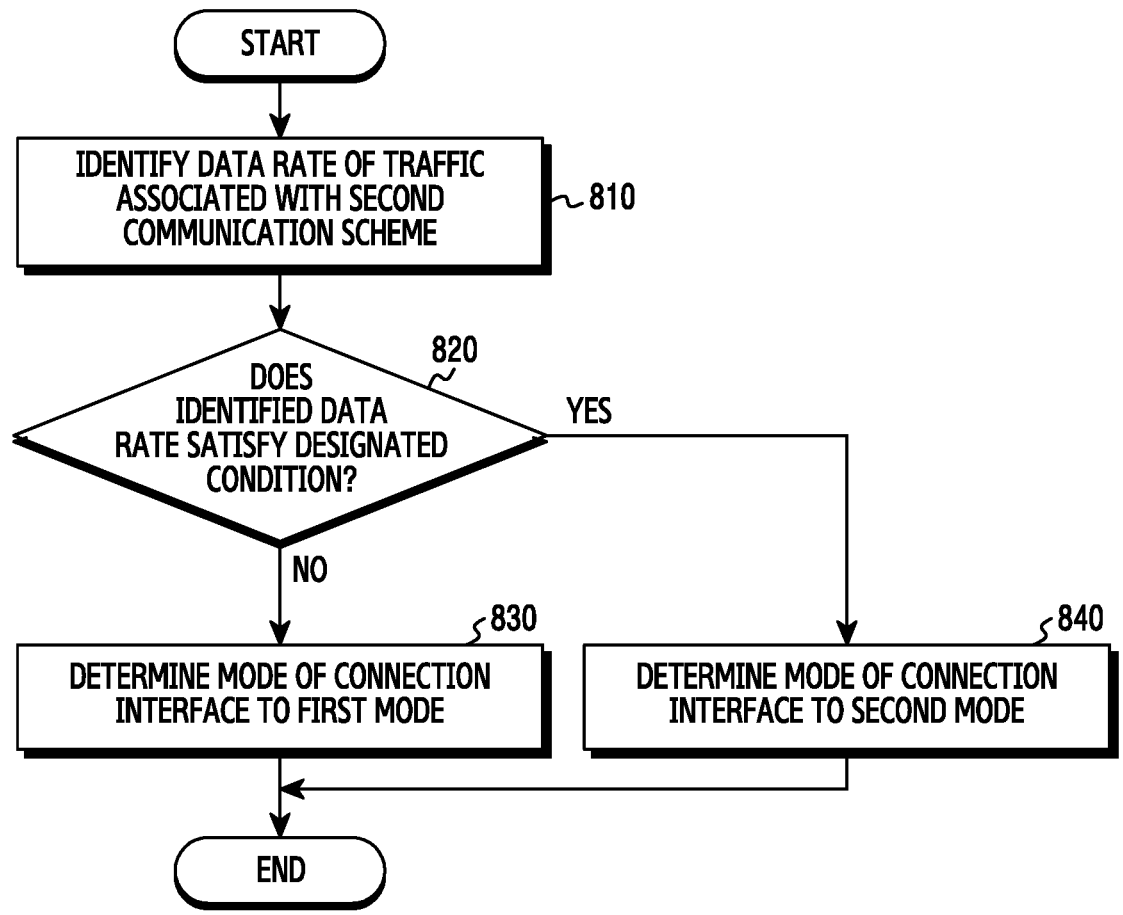
FIG. 8 is a flowchart illustrating an example of an operation of an electronic device for determining a mode of a connection interface according to various embodiments.

FIG. 8 is a flowchart illustrating an example of an operation of an electronic device for determining a mode of a connection interface according to various embodiments.

Such an operation may be performed by the electronic device 101 or at least one element (e.g., the processor 120, the communication interface 170, etc.) included in the electronic device 101.

In FIG. 8, the electronic device 101 may operate in a state of being connected to a different electronic device, based on the second communication scheme. The electronic device 101 according to various embodiments may determine the mode of the connection interface by comparing a data rate and a reference value.

Referring to FIG. 8, in operation 810, the electronic device 101 may identify a data rate of traffic associated with the second communication scheme. For example, the processor 120 may identify the data rate of the traffic associated with the second communication scheme. The electronic device 101 may identify a data rate of traffic transmitted or received on a band (e.g., 60 GHz) used in the second communication scheme.

In operation 820, the electronic device 101 may determine whether the identified data rate satisfies a designated condition. For example, the processor 120 may determine whether the identified data rate satisfies the designated condition. In various embodiments, the electronic device 101 may identify or determine whether the identified data rate is less than the reference value. For example, the reference value may be a parameter for determine whether a data rate conforming to the second communication scheme is used in the electronic device 101. In some embodiments, the reference value may be a fixed value. In some other embodiments, the reference value may be adaptively changed depending on a communication state of an environment in which the electronic device 101 is positioned. When the identified data rate does not satisfy the designated condition (e.g., when the identified data rate is less than the reference value), the electronic device 101 may perform operation 830. Otherwise, when the identified data rate satisfies the designated condition (e.g., when the identified data rate is greater than or equal to the reference value), the electronic device 101 may perform operation 840.

In operation 830, when the identified data rate does not satisfy the designated condition as a result of operation 820, the electronic device 101 may determine the mode of the connection interface to the first mode. For example, by identifying that the identified data rate is less than the reference value, the electronic device 101 may determine that it is in a state in which the connection interface is not required to have a transmission rate exceeding a maximum transmission rate of the first mode although the electronic device 101 is using the second communication scheme. The electronic device 101 may determine the mode of the connection interface to the first mode, based on the determination. In other words, the electronic device 101 may change the mode of the connection interface from the second mode to the first mode when the connection interface operates in the second mode, and may maintain the mode of the connection interface to the first mode when the connection interface operates in the first mode.

In operation 840, when the identified data rate satisfies the designated condition as a result of operation 820, the electronic device 101 may determine the mode of the connection interface to the second mode. By identifying that the identified data rate is greater than or equal to the reference value, the electronic device 101 may determine that it is in the state in which the connection interface is required to have the maximum transmission rate of the second mode. The electronic device 101 may determine the mode of the connection interface to the second mode, based on the determination. In other words, the electronic device 101 may change the mode of the connection interface from the first mode to the second mode when the connection interface operates in the first mode, and may maintain the mode of the connection interface to the second mode when the connection interface operates in the second mode.

Figure 9:
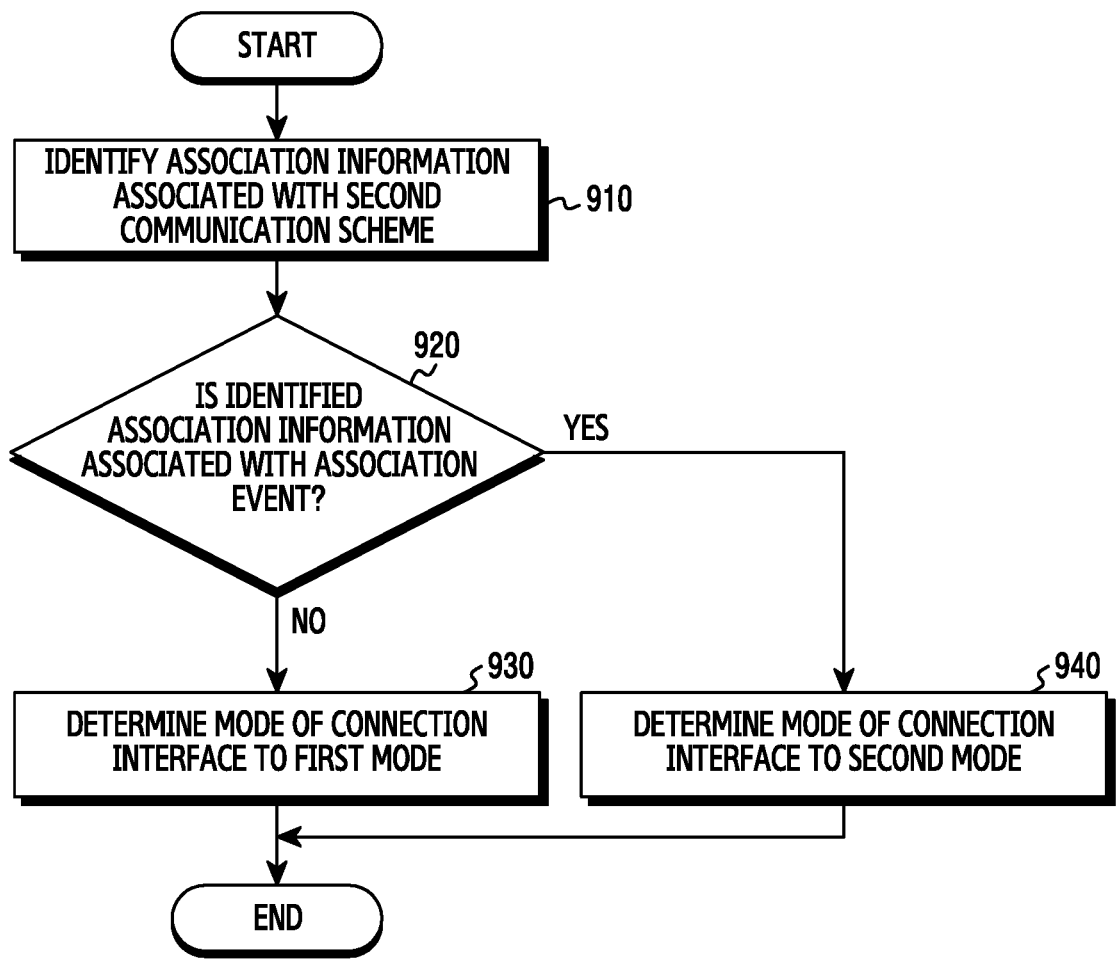
FIG. 9 is a flowchart illustrating another example of an operation of an electronic device for determining a mode of a connection interface according to various embodiments.

FIG. 9 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 9, the electronic device 101 according to various embodiments may determine the mode of the connection interface of the electronic device, by analyzing association information associated with the second communication scheme.

Referring to FIG. 8, in operation 910, the electronic device 101 may identify association information associated with the second communication scheme. For example, the processor 120 may identify the association information associated with the second communication scheme. In some embodiments, the electronic device 101 may identify the association information associated with the second communication scheme, by identifying an association request message transmitted to the different electronic device or a different entity (e.g., an Access Point (AP), a base station, etc.) from the electronic device 101. In some other embodiments, the electronic device 101 may identify the association information associated with the second communication scheme, by identifying an association response message received by the electronic device 101 from the different electronic device or the different entity. The association information may indicate an association event indicating that the electronic device 101 is connected to the different electronic device through the second communication scheme or a disconnect event indicating that an association established between the electronic device 101 and the different electronic device through the second communication scheme is disconnected.

In operation 920, the electronic device 101 may identify (determine) whether the identified connection information is associated with the association event. For example, the processor 120 may identify whether the identified association information is associated with the association event. In order to identify whether the different electronic device and the electronic device 101 are connected through the second communication scheme, the electronic device 101 may identify whether the identified connection information is associated with the association event. The electronic device 101 may perform operation 940 when the identified association information is associated with the association event. Otherwise, the electronic device 101 may perform operation 930 when the identified association information is not associated with the association event (or when it is associated with the disconnect event).

In operation 930, when the identified connection information is not associated with the association event as a result of operation 920, the electronic device 101 may determine the mode of the connection interface to the first mode. For example, when the identified information is not associated with the association event, the processor 120 may determine the mode of the connection interface to the first mode. In various embodiments, the electronic device 101 may change the mode of the connection interface from the second mode to the first mode when the connection interface operates in the second mode, and may maintain the mode of the connection interface to the first mode when the connection interface operates in the first mode.

In operation 940, when that the identified association information is associated with the association event as a result of operation 920, the electronic device 101 may determine the mode of the connection interface to the second mode. For example, when the identified association information is associated with the association event, the processor 120 may determine the mode of the connection interface to the second mode. In various embodiments, the electronic device 101 may change the mode of the connection interface from the first mode to the second mode when the connection interface operates in the first mode, or may maintain the mode of the connection interface to the second mode when the connection interface operates in the second mode.

Figure 10:
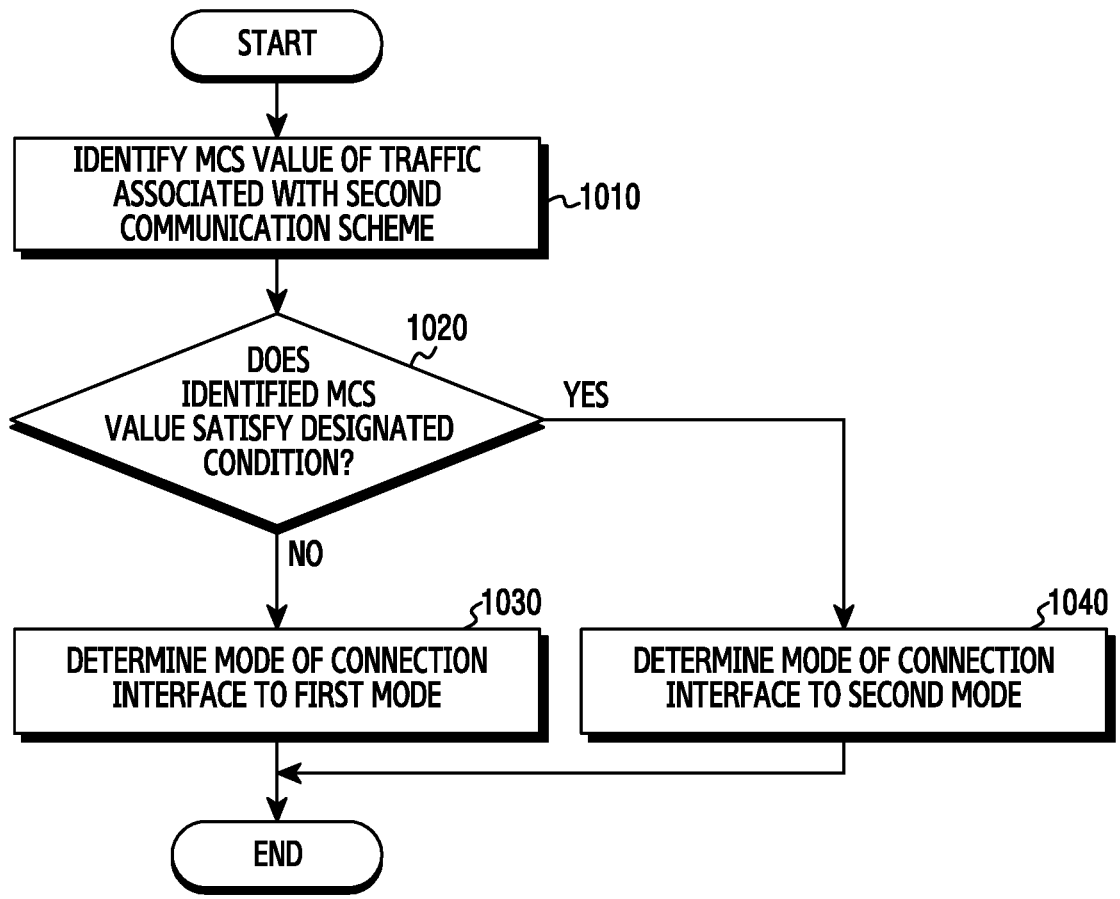
FIG. 10 is a flowchart illustrating another example of an operation of an electronic device for determining a mode of a connection interface according to various embodiments.

FIG. 10 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 10, the electronic device 101 may operate in a state of being connected to a different electronic device, based on the second communication scheme. The electronic device 101 according to various embodiments may identify an MCS value of traffic associated with the second communication scheme, and may change the mode of a connection interface according to whether the identified MCS level satisfies a designated condition.

Referring to FIG. 10, in operation 1010, the electronic device 101 may identify a Modulation and Coding Scheme (MCS) value of traffic associated with the second communication scheme. For example, the processor 120 may identify the MCS value of the traffic associated with the second communication scheme. In some embodiments, the electronic device 101 may identify an MCS value of traffic transmitted from the electronic device 101 to the different electronic device. In some other embodiments, the electronic device 101 may identify the MCS value of the traffic, by identifying control information inside a header in traffic received based on the second communication scheme from the different electronic device.

In operation 1020, the electronic device 101 may determine whether the identified MCS value satisfies a designated condition. For example, the processor 120 may determine whether the identified MSC value satisfies the designated condition. In various embodiments, the electronic device 101 may identify or determine whether the identified MCS value is less than a reference value. In some embodiments, the reference value may be a fixed value. In some other embodiments, the reference value may be adaptively changed depending on a communication state of an environment in which the electronic device 101 is positioned. When the identified MSC value does not satisfy the designated condition (e.g., when the identified MCS value is less than the reference value), the electronic device 101 may perform operation 1030. Otherwise, when the identified MCS value satisfies the designated condition (e.g., when the identified MCS value is greater than or equal to the reference value), the electronic device 101 may perform operation 1040.

In operation 1030, when the identified MCS value does not satisfy the designated condition as a result of operation 1020, the electronic device 101 may determine the mode of the connection interface to the first mode. For example, when the identified MCS value does not satisfy the designated condition, the processor 120 may determine the mode of the connection interface to the first mode. In various embodiments, when the identified MCS value is less than the reference value, the electronic device 101 may determine the mode of the connection interface to the first mode. By identifying that the identified MCS value is less than the reference value, the electronic device 101 may identify that a data transmission rate for communication between constitutional elements in the electronic device 101 corresponds to the first mode. The electronic device 101 may determine the mode of the connection interface to the first mode, based on the identification. For example, the electronic device may change the mode of the connection interface from the second mode to the first mode when the connection interface operates in the second mode, and may maintain the mode of the connection interface to the first mode when the connection interface operates in the first mode.

In operation 1040, when the identified MCS value satisfies a designated condition as a result of operation 1020, the electronic device 101 may determine the mode of the connection interface to the second mode. For example, when the identified MCS value satisfies the designated condition, the processor 120 may determine the mode of the connection interface to the second mode. In various embodiments, when the identified MCS value is greater than or equal to the reference value, the electronic device 101 may determine the mode of the connection interface to the second mode. By identifying that the identified MCS value is greater than or equal to the reference value, the electronic device 101 may identify that the data transmission rate for communication between the constitutional elements in the electronic device 101 corresponds to the second mode of the connection interface. The electronic device 101 may determine the mode of the connection interface to the second mode, based on the identification. For example, the electronic device 101 may change the mode of the connection interface from the first mode to the second mode when the connection interface operates in the first mode, or may maintain the mode of the connection interface to the second mode when the connection interface operates in the second mode.

Figure 11:
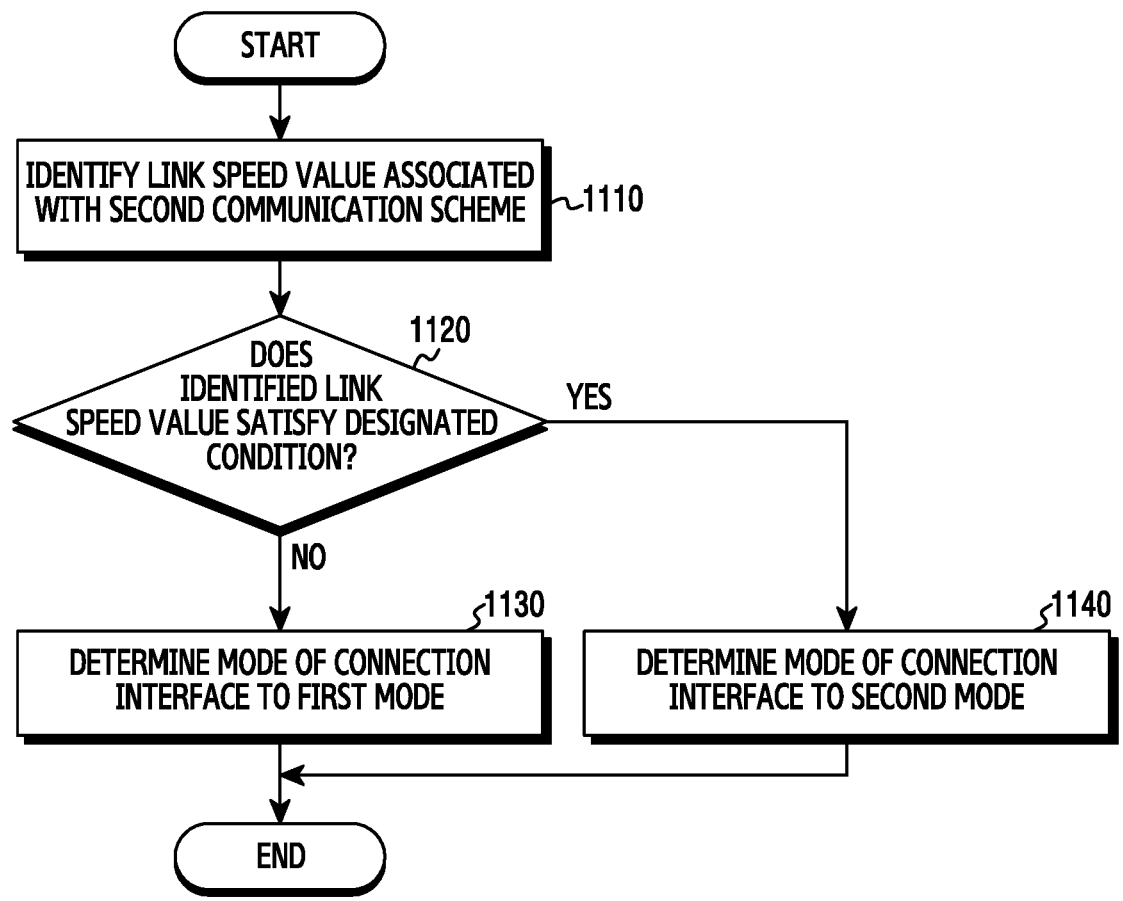
FIG. 11 is a flowchart illustrating another example of an operation of an electronic device for determining a mode of a connection interface according to various embodiments.

FIG. 11 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 11, the electronic device 101 may operate in a state of being connected to a different electronic device, based on the second communication scheme. The electronic device 101 according to various embodiments may identify a link speed value associated with the second communication scheme, and may determine a mode of the connection interface, based on the identified link speed value.

Referring to FIG. 11, in operation 1110, the electronic device 101 may identify the link speed value associated with the second communication scheme. For example, the processor 120 may identify the link speed value associated with the second communication scheme. The link speed value may be a value for indicating a state of a link between the electronic device 101 and the different electronic device. The link speed value may be identified based at least in part on a Received Signal Strength Indication (RSSI), Signal to Interference and Noise Ratio (SINR), or the like of the traffic.

In operation 1120, the electronic device 101 may determine whether the identified link speed value satisfies a designated condition. For example, the processor 120 may determine whether the identified link speed value satisfies the designated condition. In various embodiments, the electronic device 101 may identify or determine whether the identified link speed value is less than a reference value. In some embodiments, the reference value may be a fixed value. In some other embodiments, the reference value may be adaptively changed depending on a communication state of an environment in which the electronic device 101 is positioned. When the identified link speed value does not satisfy the designated condition (e.g., when the identified link speed value is less than the reference value), the electronic device 101 may perform operation 1130. Otherwise, when the identified link speed value satisfies the designated condition (e.g., when the identified link speed value is greater than or equal to the reference value), the electronic device 101 may perform operation 1140.

In operation 1130, when the identified link speed value does not satisfy the designated condition as a result of operation 1120, the electronic device 101 may determine the mode of the connection interface to the first mode. For example, when the identified link speed value does not satisfy the designated condition, the processor 120 may determine the mode of the connection interface to the first mode. By identifying that the link speed value is less than the reference value, the electronic device 101 may identify that a transmission rate required for communication between the constitutional elements in the electronic device 101 conforms to the first mode of the connection interface although the electronic device 101 is in a state of being connected to the different electronic device, based on the second communication scheme. The electronic device 101 may determine the mode of the connection interface to the first mode, based on the identification. For example, the electronic device 101 may change the mode of the connection interface from the second mode to the first mode when the connection interface operates in the second mode, or may maintain the mode of the connection interface to the first mode when the connection interface operates in the first mode.

In operation 1140, when the identified link speed value satisfies a designated condition as a result of operation 1120, the electronic device 101 may determine the mode of the connection interface to the second mode. For example, when the identified link speed value satisfies the designated condition, the processor 120 may determine the mode of the connection interface to the second mode. By identifying that the link speed value is greater than or equal to the reference value, the electronic device 101 may identify that the data transmission rate for communication between the constitutional elements in the electronic device 101 is matched to the second mode of the connection interface. The electronic device 101 may determine the mode of the connection interface to the second mode, based on the identification. For example, the electronic device 101 may change the mode of the connection interface from the first mode to the second mode when the connection interface operates in the first mode, or may maintain the mode of the connection interface to the second mode when the connection interface operates in the second mode.

Figure 12:
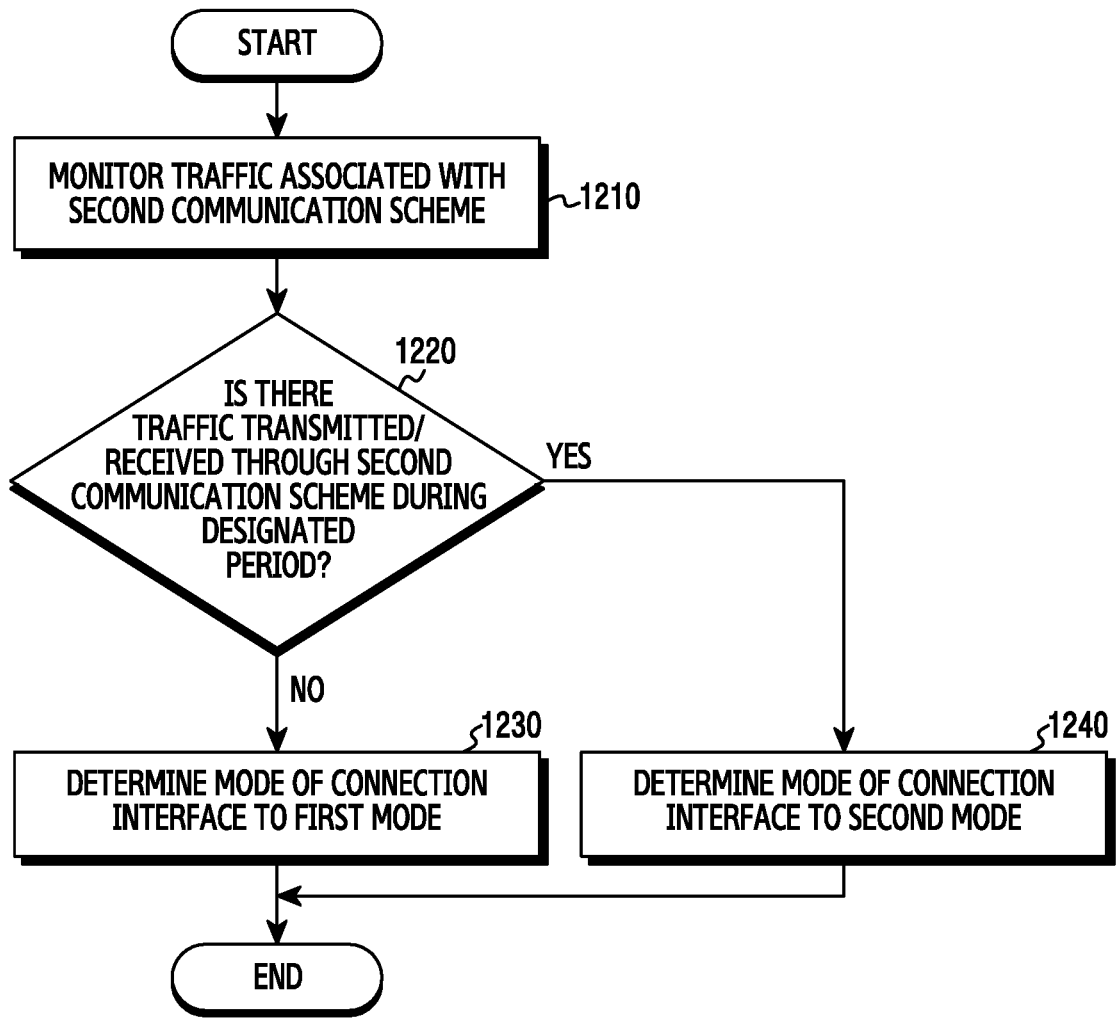
FIG. 12 is a flowchart illustrating another example of an operation of an electronic device for determining a mode of a connection interface according to various embodiments.

FIG. 12 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 12, the electronic device 101 may operate in a state of being connected to a different electronic device, based on the second communication scheme. The electronic device 101 according to various embodiments may monitor whether there is traffic transmitted/received through the second communication scheme, and may determine a mode of the connection interface according to the monitoring result.

Referring to FIG. 12, in operation 1210, the electronic device 101 may monitor traffic associated with the second communication scheme. For example, the processor 120 may monitor the traffic associated with the second communication scheme. In various embodiments, the electronic device 101 may monitor whether the traffic associated with the second communication scheme is transmitted or received. In some embodiments, the electronic device 101 may identify whether the traffic associated with the second communication scheme is transmitted or received during a designated period.

In operation 1220, the electronic device 101 may identify (determine) whether the traffic transmitted/received through the second communication scheme is present during the designated period. For example, the processor 120 may identify whether the traffic transmitted/received through the second communication scheme is present during the designated period. In various embodiments, the electronic device 101 may identify whether a connection established or created between the electronic device 101 and the different electronic device, based on the second communication scheme, is used. The designated period may be a parameter for identifying whether the traffic associated with the second communication scheme is exchanged with the different electronic device for a specific duration. In some embodiments, the designated period may be a fixed value. In some other embodiments, the designated period may be adaptively changed depending on a communication state of an environment in which the electronic device 101 is positioned. The electronic device 101 may perform operation 1230 in the absence of the traffic transmitted/received through the second communication scheme during the designated period. Otherwise, the electronic device 101 may perform operation 1240 in the presence of the traffic transmitted/received through the second communication scheme during the designated period.

In operation 1230, when the traffic transmitted/received through the second communication scheme is not present during the designated period as a result of operation 1220, the electronic device 101 may determine the mode of the connection interface to the first mode. For example, the processor 120 may determine the mode of the connection interface to the first mode in the absence of the traffic transmitted/received through the second communication scheme during the designated period. In various embodiments, by identifying that the traffic transmitted/received through the second communication scheme is not present during the designated period, the electronic device 101 may identify that it is in a state in which a path created based on the second communication scheme is not used. The electronic device 101 may determine the mode of the connection interface to the first mode, based on the identification. For example, the electronic device 101 may change the mode of the connection interface from the second mode to the first mode when the connection interface operates in the second mode, and may maintain the mode of the connection interface to the first mode when the connection interface operates in the first mode.

In operation 1240, when the traffic transmitted/received through the second communication scheme is present during the designated period as a result of operation 1220, the electronic device 101 may determine the mode of the connection interface to the second mode. For example, the processor 120 may determine the mode of the connection interface to the second mode in the presence of the traffic transmitted/received through the second communication scheme during the designated period. By identifying that the traffic transmitted/received through the second communication scheme is present during the designated period, the electronic device 101 may identify that it is in a state in which a path created based on the second communication scheme is used. The electronic device 101 may determine the mode of the connection interface to the second mode, based on the identification. For example, the electronic device 101 may change the mode of the connection interface from the first mode to the second mode when the connection interface operates in the first mode, and may maintain the mode of the connection interface to the second mode when the connection interface operates in the second mode.

Figure 13:
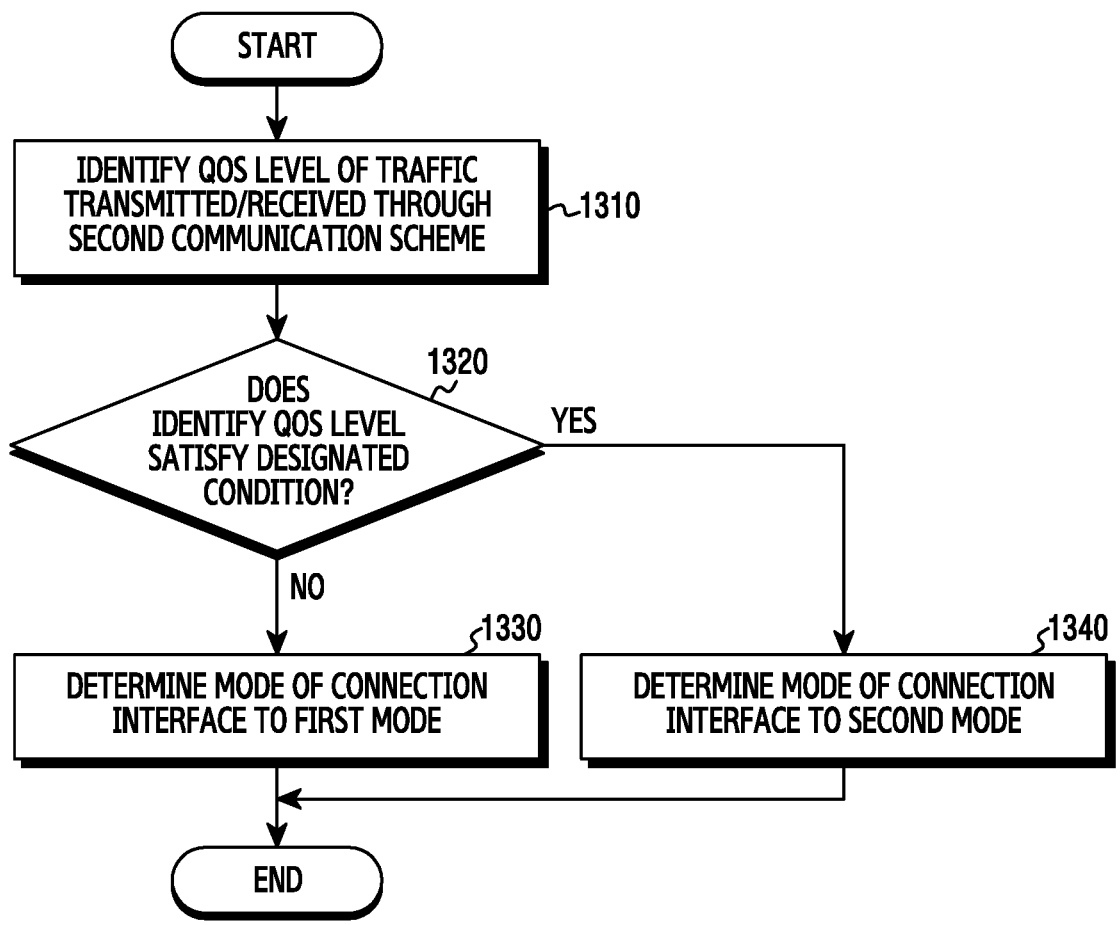
FIG. 13 is a flowchart illustrating another example of an operation of an electronic device for determining a mode of a connection interface according to various embodiments.

FIG. 13 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 13, the electronic device 101 may operate in a state of being connected to a different electronic device, based on the second communication scheme. The electronic device 101 according to various embodiments may identify a QoS level of traffic transmitted/received through the second communication scheme, and may determine a mode of the connection interface according to the identified QoS level of the traffic.

Referring to FIG. 13, in operation 1310, the electronic device 101 may identify a QoS level of traffic transmitted/received through the second communication scheme. For example, the processor 120 may identify the QoS level of the traffic transmitted/received through the second communication scheme. In various embodiments, the electronic device 101 may identify which service is associated with the traffic transmitted/received through the second communication scheme. The QoS level may indicate a type of the service associated with the traffic. For example, when the QoS level is 'a', the QoS level may indicate that the traffic is associated with a web service. For another example, when the QoS level is 'b' which is higher than 'a', the QoS level may indicate that the traffic is associated with a high-resolution streaming service.

In operation 1320, the electronic device 101 may identify (determine) whether the identified QoS level satisfies a designated condition. For example, the processor 120 may identify whether the identified QoS level satisfies the designated condition. For example, the electronic device 101 may identify whether the identified QoS level is less than a reference level. In some embodiments, the reference level may be a fixed value. In some other embodiments, the reference level may be adaptively changed depending on a communication state of an environment in which the electronic device 101 is positioned. When the identified QoS level does not satisfy the designated condition (e.g., when the identified QoS level is less than the reference level), the electronic device 101 may perform operation 1330. Otherwise, when the identified QoS level satisfies the designated condition (e.g., when the identified QoS level is greater than or equal to the reference level), the electronic device 101 may perform operation 1340.

In operation 1330, when the identified QoS level does not satisfy the designated condition as a result of operation 1320, the electronic device 101 may determine the mode of the connection interface to the first mode. For example, when the identified QoS level does not satisfy the designated condition, the processor 120 may determine the mode of the connection interface to the first mode. For example, by identifying that the identified QoS level is less than the reference level, the electronic device 101 may identify that it is in a state in which high-speed transmission is not required in communication between constitutional elements of the electronic device 101. The electronic device 101 may identify that a mode required for the connection interface (i.e., the mode of the connection interface matched to the state of the electronic device) is the first mode. The electronic device 101 may determine the mode of the connection interface to the first mode, based on the identification. For example, the electronic device may change the mode of the connection interface from the second mode to the first mode when the connection interface operates in the second mode, and may maintain the mode of the connection interface to the first mode when the connection interface operates in the first mode.

In operation 1340, when the identified QoS level satisfies the designated condition as a result of operation 1320, the electronic device 101 may determine the mode of the connection interface to the second mode. For example, when the identified QoS level satisfies the designated condition, the processor 120 may determine the mode of the connection interface to the second mode. In some embodiments, by identifying that the identified QoS level is greater than or equal to the reference level, the electronic device 101 may identify that it is in a state in which high-speed transmission is required in communication between constitutional elements of the electronic device 101. For example, the electronic device 101 may identify that the mode required for the connection interface is the second mode. The electronic device 101 may determine the mode of the connection interface to the second mode, based on the identification. For example, the electronic device 101 may change the mode of the connection interface from the first mode to the second mode when the connection interface operates in the first mode, or may maintain the mode of the connection interface to the second mode when the connection interface operates in the second mode.

Figure 14:
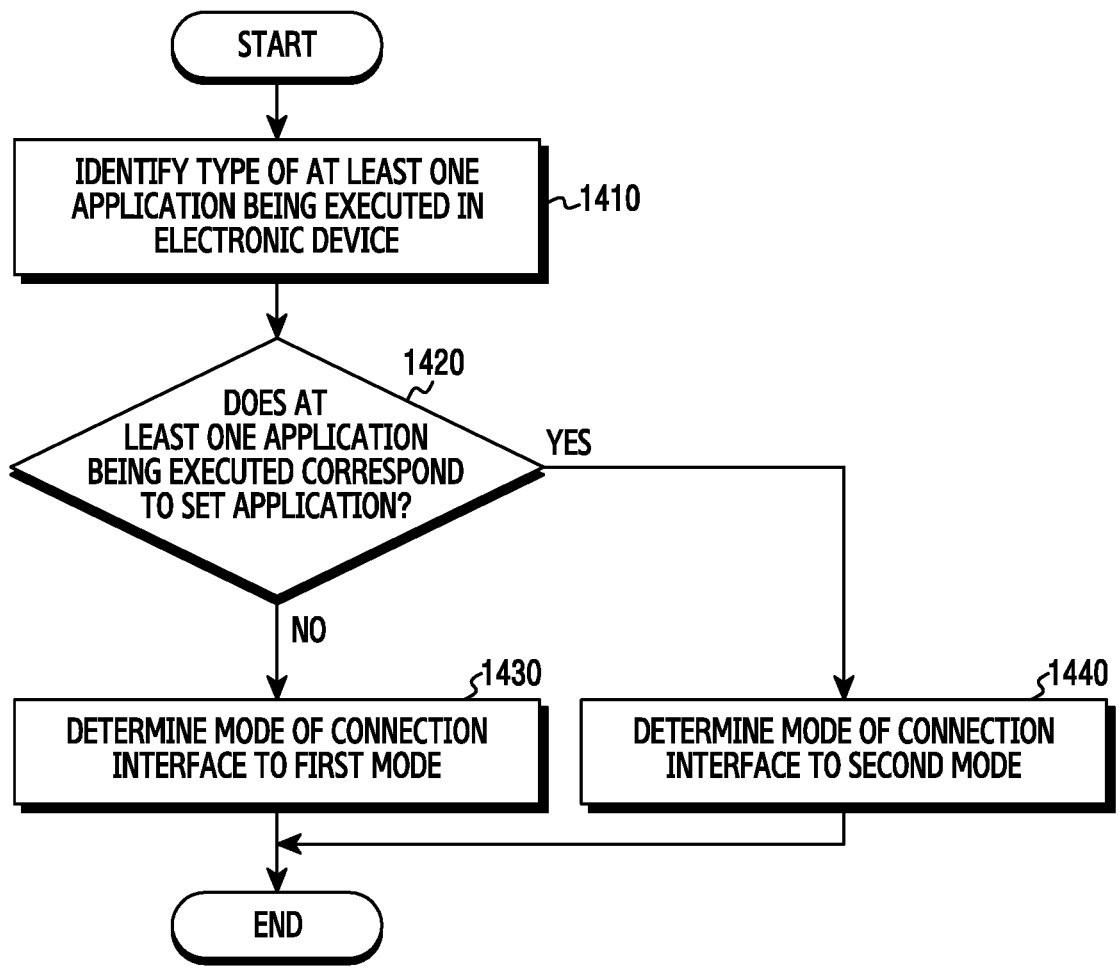
FIG. 14 is a flowchart illustrating another example of an operation of an electronic device for determining a mode of a connection interface according to various embodiments.

FIG. 14 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 14, the electronic device 101 according to various embodiments may identify a type of at least one application being executed in the electronic device, and may determine a mode of the connection interface according to the identified type of the at least one application.

Referring to FIG. 14, in operation 1410, the electronic device 101 may identify the type of the at least one application being executed in the electronic device 101. For example, the processor 120 may identify the type of the at least one application being executed in the electronic device 101. In various embodiments, the electronic device 101 may identify the type of the at least one application to determine whether it is a state in which the electronic device 101 is required to use high-speed communication.

In operation 1420, the electronic device 101 may identify (determine) whether the at least one application corresponds to a set application. For example, the processor 120 may identify whether the at least one application corresponds to the set application. The set application may be reference data for identifying whether the electronic device 101 requires high-speed communication.

The set application may be configured using various schemes.

In some embodiments, the set application may be configured through machine learning of the electronic device 101. For example, the electronic device 101 may monitor whether the mode of the connection interface is changed due to an application executed in the electronic device 101. The electronic device 101 may map data for indicating whether the mode of the connection interface is changed to the application being executed and may store mapping information, based on the monitoring result. The electronic device 101 may configure the set application, based on the stored information.

In some other embodiments, the set application may be configured based on an analysis result of data (or a file) associated with the application executed in the electronic device 101. For example, the electronic device 101 may detect one or more of information indicating whether the application is associated with communication and information associated with a QoS of traffic exchanged with an external electronic device through the application, from the data associated with the application. The electronic device 101 may determine a required communication state when the application is executed, based on the detected information. The electronic device 101 may configure the set application, based on the determined communication state.

The electronic device 101 may identify (determine) whether the at least one application corresponds to the set application, in order to identify whether the electronic device 101 operates in a state in which a connection based on the second communication scheme is required (or a state in which the electronic device 101 requires high-speed communication). When the at least one application does not correspond to the set application, the electronic device 101 may perform operation 1430. Otherwise, when the at least one application corresponds to the set application, the electronic device 101 may perform operation 1440. In some embodiments, the electronic device 101 may further identify whether the electronic device 101 is connected to a different electronic device, based on the second communications scheme.

In operation 1430, when the at least one application does not correspond to the set application as a result of operation 1420, the electronic device 101 may determine the mode of the connection interface to the first mode. For example, when the at least one application does not correspond to the set application, the processor 120 may determine the mode of the connection interface to the first mode. In various embodiments, by identifying that the at least one application does not correspond to the set application, the electronic device 101 may determine that a current state of the electronic device 101 is a state in which high-speed communication is not required. The electronic device 101 may determine the mode of the connection interface to the first mode, based on the identification. For example, the electronic device may change the mode of the connection interface from the second mode to the first mode when the connection interface operates in the second mode, and may maintain the mode of the connection interface to the first mode when the connection interface operates in the first mode.

In operation 1440, when the at least one application corresponds to the set application as a result of operation 1420, the electronic device 101 may determine the mode of the connection interface to the second mode. For example, when the at least one application corresponds to the set application, the processor 120 may determine the mode of the connection interface to the second mode. In various embodiments, by identifying that the at least one application corresponds to the set application, the electronic device 101 may identify that a current state of the electronic device 101 is a state in which high-speed communication is required. The electronic device 101 may determine the mode of the connection interface to the second mode, based on the identification. For example, the electronic device 101 may change the mode of the connection interface from the first mode to the second mode when the connection interface operates in the first mode, or may maintain the mode of the connection interface to the second mode when the connection interface operates in the second mode.

Figure 15:
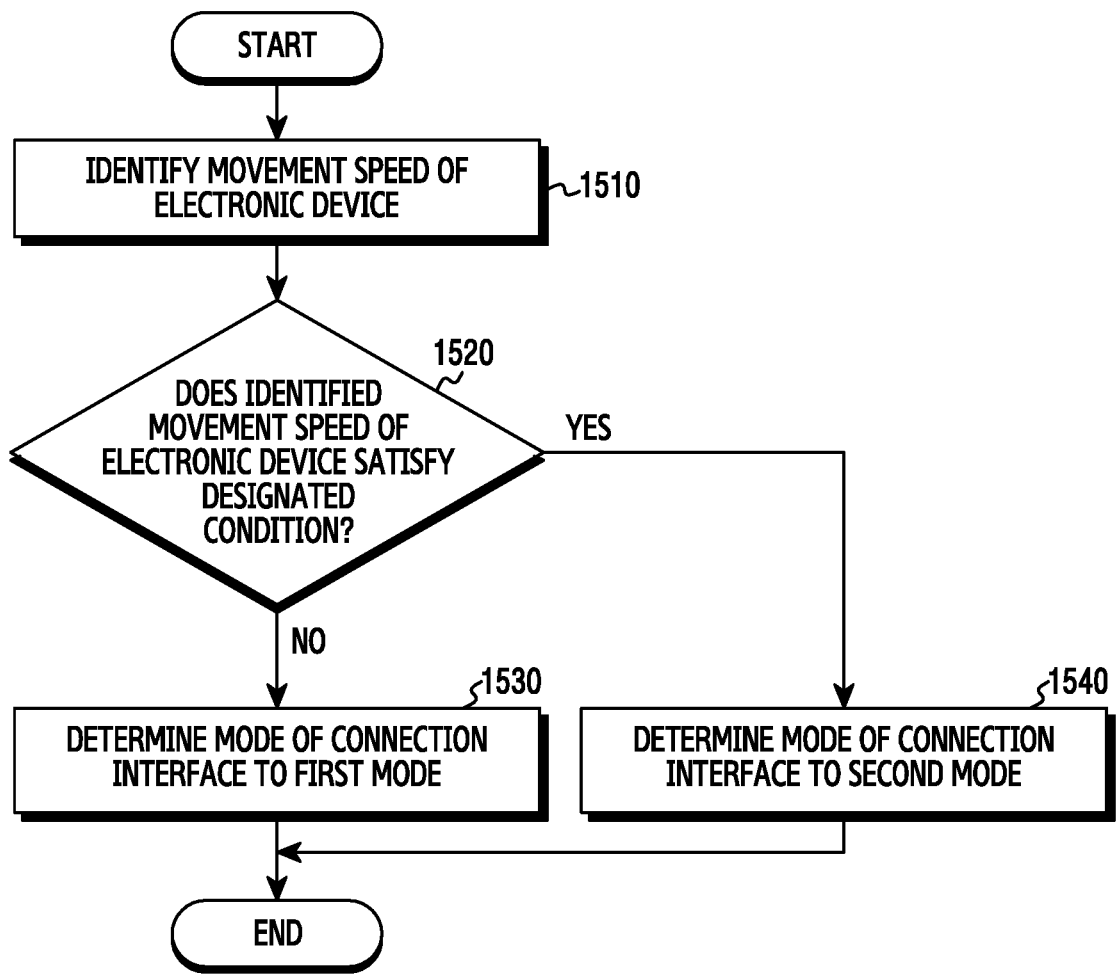
FIG. 15 is a flowchart illustrating another example of an operation of an electronic device for determining a mode of a connection interface according to various embodiments.

FIG. 15 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 15, the electronic device 101 may operate in a state of being connected to a different electronic device, based on the second communication scheme. The electronic device 101 according to various embodiments may identify a movement speed of the electronic device 101, and may determine a mode of the connection interface according to the identified movement speed.

Referring to FIG. 15, in operation 1510, the electronic device 101 may identify a movement speed of the electronic device 101. For example, the processor 120 may identify the movement speed of the electronic device 101. The electronic device 101 may identify the movement speed of the electronic device 101 by using one or more of at least one sensor in the electronic device 101, a GPS in the electronic device 101, a communication interface in the electronic device 101, and a communication module in the electronic device 101. The electronic device 101 may identify the movement speed of the electronic device 101, in order to identify whether a state associated with mobility of the electronic device 101 corresponds to the second communication scheme. The identifying of the movement speed may be triggered under the condition that a connection between the electronic device 101 and the different electronic device is established based on the second communication scheme. The identifying of the movement speed may be performed repetitively with a designated period or may be performed continuously.

In operation 1520, the electronic device 101 may identify or determine whether the movement speed of the identified electronic device 101 satisfies a designated condition. For example, the processor 120 may identify whether the movement speed of the identified electronic device 101 satisfies the designated condition. In some embodiments, the electronic device 101 may identify whether the identified movement speed of the electronic device 101 is less than a reference speed. According to embodiments, the reference speed may be a fixed value, or may be adaptively changed depending on a communication state of an environment in which the electronic device 101 is positioned. When the identified movement speed of the electronic device 101 satisfies the designated condition (when the identified movement speed of the electronic device 101 is less than the reference speed), the electronic device 101 may perform operation 1540. Otherwise, when the identified movement speed of the electronic device 101 does not satisfy the designated condition (e.g., when the identified movement speed of the electronic device 101 is greater than or equal to the reference speed), the electronic device 101 may perform operation 1530.

In operation 1530, when the identified movement speed of the electronic device 101 does not satisfy the designated condition as a result of operation 1520, the electronic device 101 may determine the mode of the connection interface to the first mode. For example, when the movement speed of the electronic device 101 does not satisfy the designated condition, the processor 120 may determine the mode of the connection interface to the first mode. By identifying that the movement speed of the electronic device 101 is greater than or equal to the reference speed, the electronic device 101 may identify that a state of the electronic device 101 is a state not suitable for high-speed communication. When the electronic device 101 moves at a speed greater than or equal to the reference speed, a signal transmitted or received through a beam by using the second communication scheme may not be normally processed. This may be because beam tracking or the like may not be easy since the electronic device 101 moves at the speed greater than or equal to the reference speed. By identifying that the movement speed does not satisfy the designated condition, the electronic device 101 may identify that it is in a state in which a transmission rate required for communication between the constitutional elements of the electronic device 101 conforms to the first mode of the connection interface. The electronic device 101 may determine the mode of the connection interface to the first mode, based on the identification. For example, the electronic device may change the mode of the connection interface from the second mode to the first mode when the connection interface operates in the second mode, and may maintain the mode of the connection interface to the first mode when the connection interface operates in the first mode.

In operation 1540, when the identified movement speed of the electronic device 101 satisfies a designated condition as a result of operation 1520, the electronic device 101 may determine the mode of the connection interface to the second mode. By identifying that the movement speed of the electronic device 101 is less than the reference speed, the electronic device 101 may identify that the state of the electronic device 101 is a state suitable for high-speed communication. This may be because a signal transmitted or received through a beam by using the second communication scheme may be normally processed since beam tracking or the like is easy when the electronic device moves at a speed less than the reference speed. By identifying that the movement speed is less than the reference speed, the electronic device 101 may identify that it is in a state in which a transmission rate required for communication between the constitutional elements of the electronic device 101 conforms to the second mode of the connection interface. The electronic device 101 may determine the mode of the connection interface to the second mode, based on the identification. For example, the electronic device 101 may change the mode of the connection interface from the second mode to the first mode when the connection interface operates in the second mode, or may maintain the mode of the connection interface to the first mode when the connection interface operates in the first mode.

Figure 16:
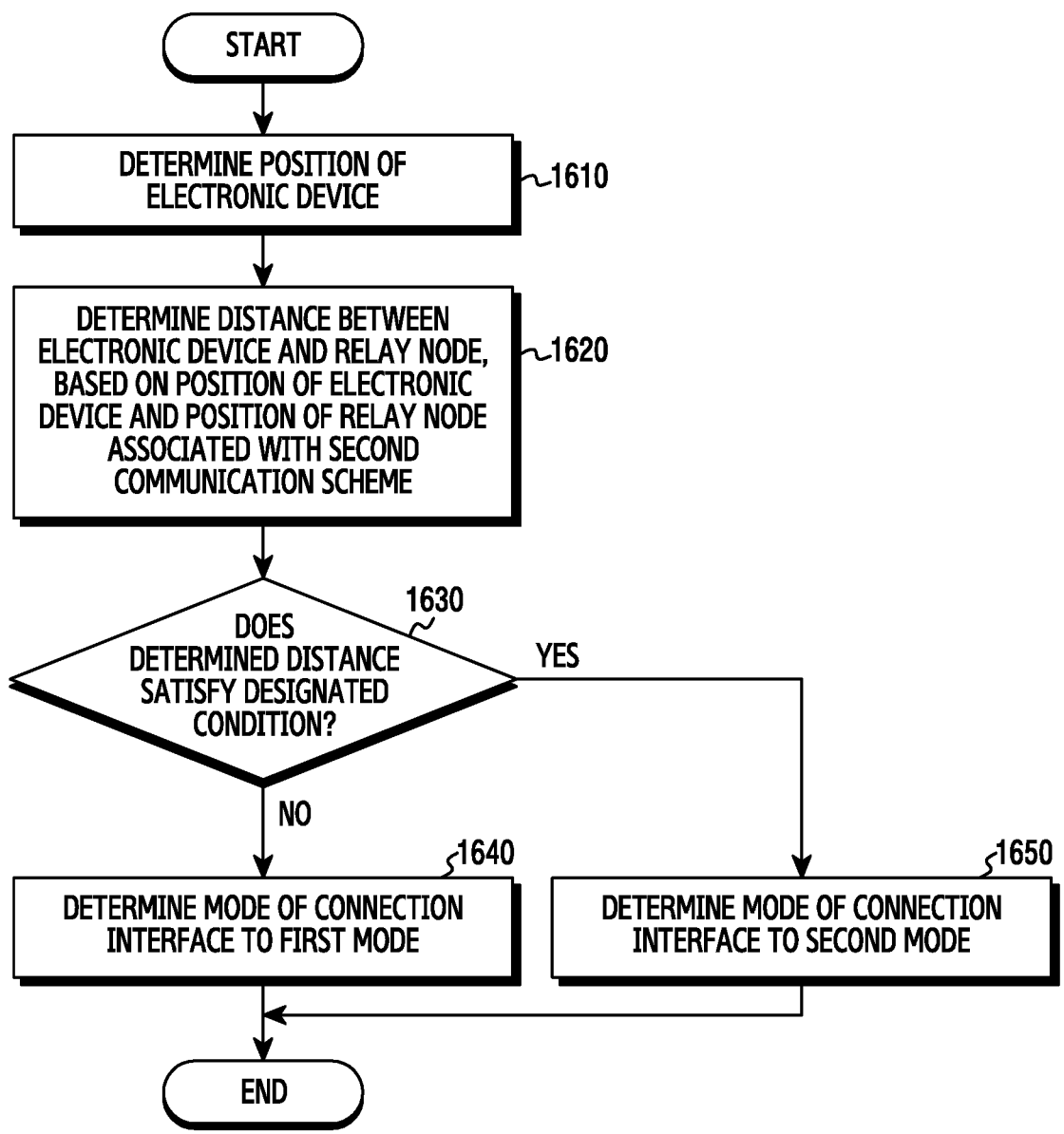
FIG. 16 is a flowchart illustrating another example of an operation of an electronic device for determining a mode of a connection interface according to various embodiments.

FIG. 16 is a flowchart illustrating another example of an operation of an electronic device for determining a mode of a connection interface according to various embodiments. Such an operation may be performed by the electronic device 101 or at least one element (e.g., the processor 120, the communication interface 170, etc.) included in the electronic device 101.

In FIG. 16, the electronic device 101 may operate in a state of being connected to a different electronic device, based on the second communication scheme. The electronic device 101 according to various embodiments may determine a distance between the electronic device 101 and a relay node associated with the electronic device 101 and associated with the second communication scheme, and may determine a mode of the connection interface according to the determined distance.

Referring to FIG. 16, in operation 1610, the electronic device 101 may determine a position of the electronic device 101. For example, the processor 120 may determine the position of the electronic device 101. The electronic device 101 may determine the position of the electronic device 101, in order to determine a relation of a position between the electronic device 101 and a relay node (e.g., an Access Point (AP)) to which the electronic device 101 is accessed and which is associated with the second communication. The position of the electronic device 101 may be determined by using one or more of a sensor, GPS, communication module, and communication interface in the electronic device 101.

In operation 1620, the electronic device 101 may determine a distance between the electronic device 101 and the relay node, based on the position of the electronic device 101 and the position of the relay node associated with the second communication scheme. Communication quality of the electronic device 101 may be determined based the distance between the relay node and the electronic device 101. The communication quality may be expressed by a Channel Quality Indication (CQI), a Channel State Indication (CSI), or the like. For example, the communication quality of the electronic device 101 may relatively deteriorate when the distance between the electronic device 101 and the relay node becomes relatively long. For another example, the communication quality of the electronic device 101 may be relatively improved when the distance between the electronic device 101 and the relay node becomes relatively short. The electronic device 101 may determine the distance between the electronic device 101 and the relay node or a positional relation between the electronic device 101 and the relay node, based on the position of the electronic device 101 and the position of the relay node associated with the second communication scheme.

In operation 1630, the electronic device 101 may identify or determine whether the determined distance satisfies a designated condition. For example, the processor 120 may identity or determine whether the determined distance satisfies the designated condition. In various embodiments, the electronic device 101 may identify whether the determined distance is greater than or equal to a reference distance. The electronic device 101 may identify whether the determined distance is greater than or equal to the reference distance to predict a transmission rate of traffic associated with the second communication scheme. In some embodiments, the reference value may be a fixed value. In some other embodiments, the reference distance may be adaptively changed depending on a communication state of an environment in which the electronic device 101 is positioned. In some other embodiments, the reference distance may change depending on performance or capability of the relay node. When the determined distance does not satisfy the designated condition (e.g., when the determined distance is greater than or equal to the reference distance), the electronic device 101 may perform operation 1640. Otherwise, when the determined distance satisfies the designated condition (e.g., when the determined distance is less than the reference distance), the electronic device 101 may perform operation 1650.

In operation 1640, when the determined distance does not satisfy the designated condition as a result of operation 1630, the electronic device 101 may determine the mode of the connection interface to the first mode. For example, when the determined distance does not satisfy the designated condition, the processor 120 may determine the mode of the connection interface to the first mode. In various embodiments, by identifying that the determined distance is greater than or equal to the reference distance, the electronic device 101 may recognize that the electronic device 101 has a poor communication state associated with the second communication scheme. The electronic device 101 may determine the mode of the connection interface to the first mode, based on the recognition result. For example, the electronic device may change the mode of the connection interface from the second mode to the first mode when the connection interface operates in the second mode, and may maintain the mode of the connection interface to the first mode when the connection interface operates in the first mode.

In operation 1650, when the determined distance satisfies a designated condition as a result of operation 1630, the electronic device 101 may determine the mode of the connection interface to the second mode. For example, when the determined distance satisfies the designated condition, the processor 120 may determine the mode of the connection interface to the second mode. By identifying that the determined distance is less than the reference distance, the electronic device 101 may recognize that the electronic device 101 has a good communication state associated with the second communication scheme. The electronic device 101 may determine the mode of the connection interface to the second mode, based on the recognition result. For example, the electronic device 101 may change the mode of the connection interface from the second mode to the first mode when the connection interface operates in the second mode, or may maintain the mode of the connection interface to the first mode when the connection interface operates in the first mode.

Figure 17:
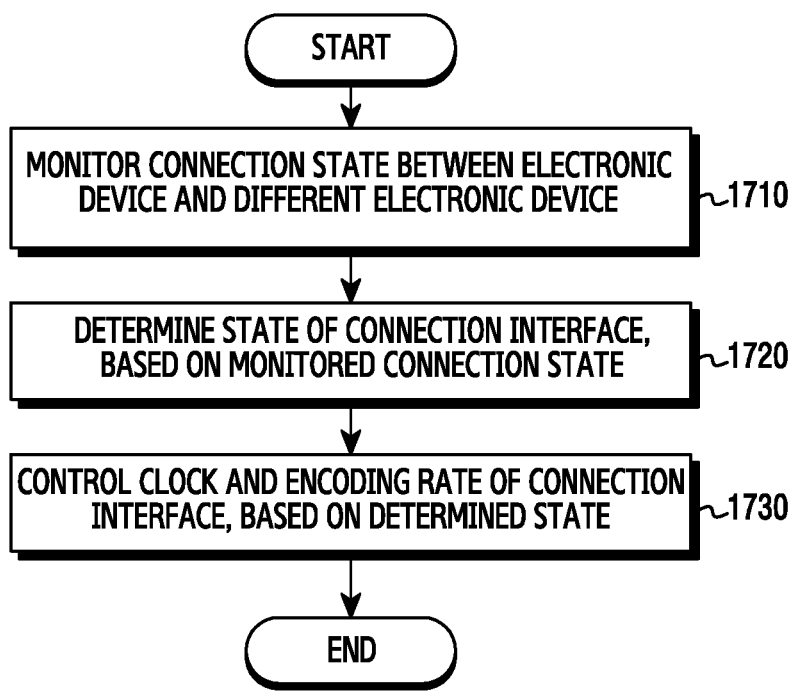
FIG. 17 is a flowchart illustrating an example of an operation of an electronic device for controlling a clock and encoding rate of a connection interface according to various embodiments.

FIG. 17 is a flowchart illustrating an example of an operation of an electronic device for controlling a clock and encoding rate of a connection interface according to various embodiments. Such an operation may be performed by the electronic device 101 or at least one element (e.g., the processor 120, the communication interface 170, etc.) included in the electronic device 101.

In FIG. 17, the electronic device 101 according to various embodiments may control a clock and encoding rate of the connection interface by monitoring a connection state with respect to a different electronic device and by determining a state of the connection interface in response to a monitoring result.

Referring to FIG. 17, in operation 1710, the processor 120 may monitor a connection state between the electronic device 101 and a different electronic device. For example, when the connection state is established, the processor 120 may identify a communication scheme associated with the connection state. The communication scheme may be the first communication scheme or the second communication scheme. For another example, by identifying information associated with traffic transmitted/received through a connection with the different electronic device, the processor 120 may monitor the connection state with respect to the different electronic device. The information associated with traffic may be one or more of data for indicating a state of connection with the different electronic device (e.g., a Channel Quality Indication (CQI), a Channel State Indication (CSI), etc.) and data for indicating a state of traffic to be received from the different electronic device or transmitted to the different electronic device (e.g., a data rate, a Modulation and Coding Scheme (MCS) value, a transmission rate, a reception rate, a Quality of Service (QoS), etc.).

In operation 1720, the processor 120 may determine a state of the connection interface, based on the monitored connection state. For example, the processor 120 may determine a state corresponding to the monitored connection state to the state of the connection interface from a plurality of states of FIG. 5. For example, when the electronic device 101 is connected to the different electronic device through the first communication scheme, the processor 120 may determine the state of the connection interface to the generation 1 L0 state 510. For another example, when the electronic device 101 is connected to the different electronic device through the second communication scheme, the processor 120 may determine the state of the connection interface to the generation 2 L0 state 560. For another example, in the absence of traffic transmitted from the electronic device 101 or traffic received in the electronic device, the processor 120 may determine the state of the connection interface to one of the L1 state 520, the L1.1 state 530, and the L1.2 state 540. For another example, when the electronic device 101 starts to use the connection with respect to the different electronic device, the processor 120 may determine the state of the connection interface to the recovery state 550 or the recovery state 570. The state of the connection interface may be changed to the generation 1 L0 state 510 or the generation 2 L0 state 560 via the recovery state 550 or the recovery state 570

In operation 1730, the processor 120 may control a clock and encoding rate of the connection interface, based on the determined state. For example, when the determined state is the generation 1 L0 state 510, as disclosed in Table 1, the processor 120 may provide control such that the clock of the connection interface is 2.5 GHz and the encoding rate (or encoding scheme) of the connection interface is 8b/10b. For another example, when the determined state is the generation 2 L0 state 560, the processor 120 may provide control such that the clock of the connection interface is 5 GHz and the encoding rate of the connection interface is 8b/10b. For another example, when the determined state is one of the L1 state 520, the L1.1 state 530, and the L1.2 state 540, the clock and encoding rate of the connection interface may be controlled such that at least one configuration of (or associated with) the connection interface operates in an inactive state. For another example, when the determined state is the recovery state 550 or the recovery state 570, the processor 120 may provide control such that the clock and encoding rate of the connection interface conform to the state of the connection interface (e.g., the generation 1 L0 state 510, the generation 2 L0 state 560, etc.) after elapsing a time in which the connection interface operates in the recovery state.

Figure 18:
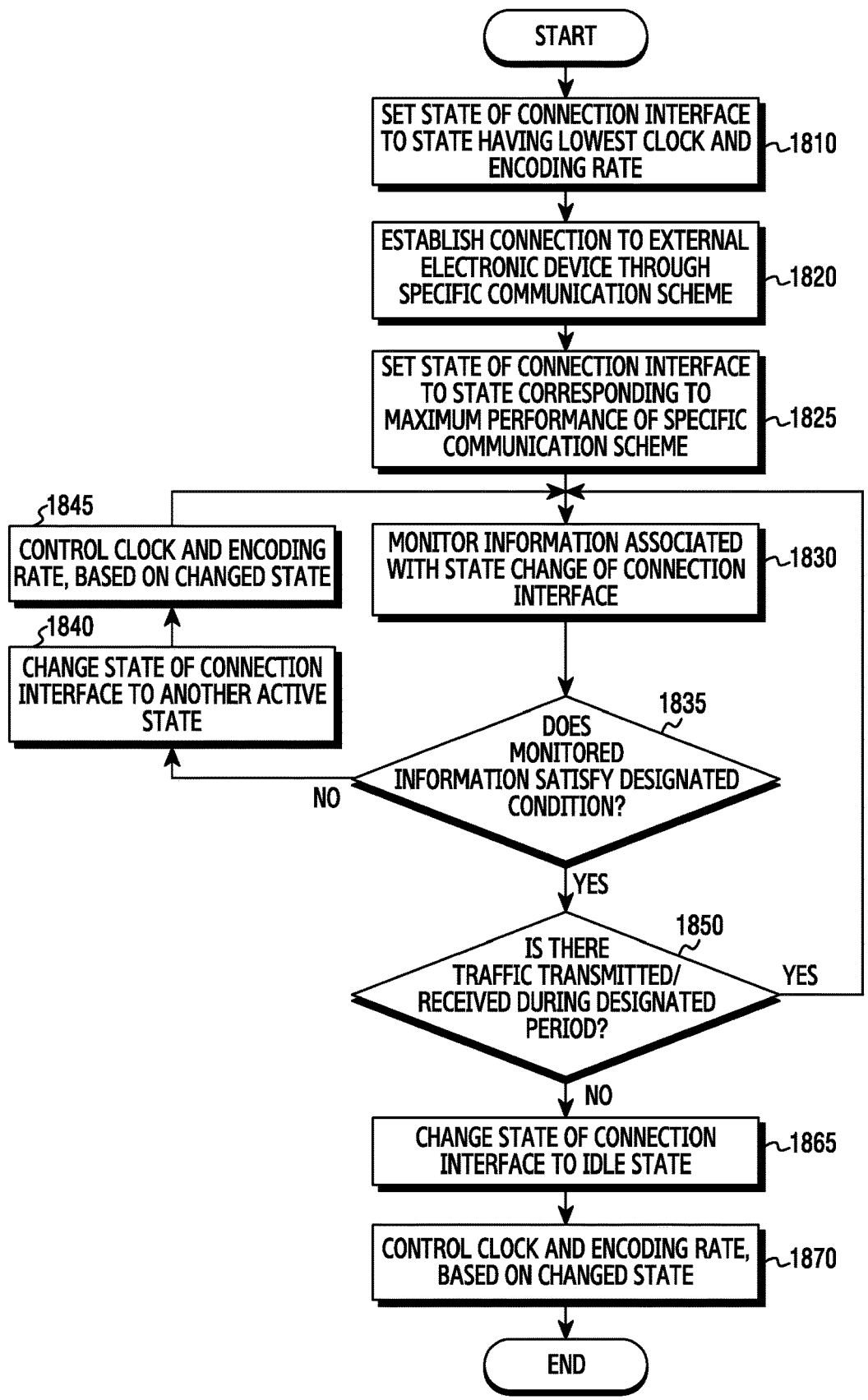
FIG. 18 is a flowchart illustrating another example of an operation of an electronic device for controlling a clock and encoding rate of a connection interface according to various embodiments.

FIG. 18 is a flowchart illustrating another example of an operation of an electronic device for controlling a clock and encoding rate of a connection interface according to various embodiments. Such an operation may be performed by the electronic device 101 or at least one element (e.g., the processor 120, the communication interface 170, etc.) included in the electronic device 101.

In FIG. 18, the processor 120 of the electronic device 101 according to various embodiments may monitor information associated with a state change of the connection interface, and may control a clock and encoding rate of the connection interface according to a monitoring result.

Referring to FIG. 18, in operation 1810, the processor 120 may set a state of the connection interface to a state of having a lowest clock and encoding rate. For example, the processor 120 may set the state of the connection interface to the generation 1 L0 state 510 of FIG. 5.

In operation 1820, the processor 120 may establish a connection with an external electronic device through a specific communication scheme. For example, the processor 120 may establish the connection with the external electronic device through the specific communication scheme by controlling the communication interface 170 or the like. For example, the specific communication scheme may be the first communication scheme or the second communication scheme. In some embodiments, unlike in FIG. 18, the processor 120 may monitor that the electronic device's function associated with the specific communication scheme is activated, irrespective of whether the connection with the external electronic device is established.

In operation 1825, the processor 120 may set a state of the connection interface to a state corresponding to maximum performance of the specific communication scheme. For example, when the specific communication scheme is the first communication scheme, the processor 120 may set the state of the connection interface to the generation 1 L0 state 510. For another example, when the specific communication scheme is the second communication scheme, the processor 120 may set the state of the connection interface to the generation 2 L0 state 560.

In operation 1830, the processor 120 may monitor information associated with the state change of the connection interface. For example, the information associated with the state change of the connection interface may include one or more of data for indicating a state (or quality) of a connection (or channel) with respect to the different electronic device (e.g., channel state information, channel quality information, etc.), data for indicating a state of traffic associated with the electronic device 101 (e.g., an MCS of traffic, a data rate, etc.), and data for indicating a state of the electronic device 101 (e.g., a movement speed of the electronic device, a type of an executed application, etc.).

In operation 1835, the processor 120 may determine whether the monitored information satisfies a designated condition. The designated condition may be a parameter used to determine whether a current state of the connection interface conforms to a communication-related state of the electronic device.

When the monitored information does not satisfy the designated condition as a result of operation 1835, the processor 120 may, in operation 1840, change the state of the connection interface to another active state. For example, when the current state of the connection interface is the generation 2 L0 state 560 and when the monitored information does not satisfy the designated condition, the processor 120 may change the state of the connection interface to the generation 1 L0 state 510.

In operation 1845, the processor 120 may control a clock and encoding rate of the connection interface, based on the changed state. For example, when the state of the connection interface is changed from the generation 2 L0 state 560 to the generation 1 L0 state 510, the processor 120 may provide control to change the clock of the connection interface to 2.5 GHz, and may provide control to maintain the encoding rate of the connection interface. After executing operation 1845, the processor 120 may repeat operation 1830.

When the monitored information satisfies the designated condition as a result of operation 1835, in operation 1850, the processor 120 may determine whether traffic to be transmitted/received is present during a designated period. Even if a state associated with communication of the electronic device 101, a state associated with a movement of the electronic device 101, or a state associated with an application executed in the electronic device 101 conforms to the designated condition, the connection interface may not be required to operate in an activate state in the absence of traffic associated with the electronic device 101. The processor 120 may determine whether the traffic is present during a designated period, in order to identify whether the connection interface is used in practice.

When the traffic is present during the designated period as a result of operation 1850, the processor 120 may perform operation 1830 again.

When the traffic is not present during the designated period as a result of operation 1850, in operation 1865, the processor 120 may change from the state of the connection interface to an idle state. For example, the processor 120 may change the connection interface such as the L1 state 520, L1.1 state 530, or L1.2 state 540 of FIG. 5 to the idle state.

In operation 1870, the processor 120 may control the clock and encoding rate of the connection interface, based on the changed idle state. The processor 120 may deactivate a configuration (e.g., PLL, etc.) associated with the connection interface, in conjunction with the control.

As described above, a method of an electronic device (e.g., the electronic device 101) according to various embodiments may include detecting that the electronic device is connected to another electronic device based on the second communication scheme, identifying a mode of the connection interface, based on the detection, and changing, if the identified mode of the connection interface corresponds to a first mode, a mode of the connection interface from the first mode to a second mode.

In some embodiments, a band associated with the second communication scheme may be higher than a band associated with the first communication scheme, and a maximum data rate that is supported by the connection interface operating in the second mode may be higher than a maximum data rate that is supported by the connection interface operating in the first mode.

In some other embodiments, the method may further include identifying information associated with a communication, based on that the connection interface operates in the second mode, and changing a mode of the connection interface from the second mode to the first mode, if the information associated with the communication satisfies a designated condition. In an embodiment, the information may include information regarding modulation and coding scheme (MCS) value associated with a traffic that is transmitted or received based on the second communication scheme, and the changing of the mode of the connection interface from the second mode to the first mode may include changing the mode of the connection interface from the second mode to the first mode, if the MCS value is less than a reference value. In another embodiment, the information may include information regarding a data rate of a traffic that is transmitted or received based on the second communication scheme, and the changing of the mode of the connection interface from the second mode to the first mode may include changing the mode of the connection interface from the second mode to a first mode, if the data rate is less than a reference value. In another embodiment, the information may include information regarding whether a traffic is transmitted or received based on the second communication scheme, and the changing of the mode of the connection interface from the second mode to the first mode may include changing the mode of the connection interface from the second mode to the first mode, if the traffic is transmitted or received based on the second communication scheme during a pre-determined period. In another embodiment, the information may include information regarding at least one application being executed in the electronic device, and the changing of the mode of the connection interface from the second mode to the first mode may include changing the mode of the connection interface from the second mode to the first mode, if a type of the at least one processor is a designated type. In another embodiment, the information may include information regarding a movement speed of the electronic device, and the changing of the mode of the connection interface from the second mode to the first mode may include changing the mode of the connection interface from the second mode to the first mode, if the movement speed is higher than or equal to a designated speed. In another embodiment, the information may include information regarding a quality of service (QoS) of a traffic transmitted or received based on the second communication scheme, and the changing of the mode of the connection interface from the second mode to the first mode may include changing the mode of the connection interface from the second mode to the first mode, if the QoS corresponds to a designated QoS. In another embodiment, the information may include information regarding a value for indicating a state of a battery of the electronic device, and the changing of the mode of the connection interface from the second mode to the first mode may include changing the mode of the connection interface from the second mode to the first mode, if the value for indicating the state of the battery is less than a reference value.

Methods based on the embodiments disclosed in the claims and/or specification of the present disclosure can be implemented in hardware, software, or any combination thereof.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (e.g., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

While the present disclosure has been illustrated and described with reference to various example embodiments thereof, it will be understood by those skilled in the art that various changes in form and details may be made therein without departing from the spirit and scope of the present disclosure as defined by the appended claims. Therefore, the scope of the present disclosure is not limited by the detailed description thereof but is defined by the appended claims, and all differences within equivalents of the scope will be understood as being included in the present disclosure.

What is claimed is:

1. An electronic device comprising:
a memory configured to store instructions;
a communication interface comprising circuitry configured to operate in a first communication scheme and a second communication scheme;
at least one processor operably coupled to the memory; and
a connection interface comprising circuitry configured to connect the at least one processor to the communication interface,
wherein the at least one processor is configured to execute instructions stored in the memory to cause the electronic device to:
detect that the electronic device is connected to another electronic device based on the second communication scheme;
identify information associated with a communication based on that the connection interface operates in a second mode; and
change a mode of the connection interface from the second mode to a first mode if the information associated with the communication satisfies a designated condition,
wherein the information includes information regarding a modulation and coding scheme (MCS) value associated with traffic that is transmitted and/or received based on the second communication scheme,
wherein the at least one processor is further configured to execute the stored instructions to cause the electronic device to change the mode of the connection interface from the second mode to the first mode if the MCS value is less than a reference value.

2. The electronic device of claim 1, wherein a band associated with the second communication scheme is higher than a band associated with the first communication scheme, and wherein a maximum data rate supported by the connection interface operating in the second mode is higher than a maximum data rate supported by the connection interface operating in the first mode.

3. The electronic device of claim 1, wherein the information includes information regarding a data rate of traffic that is transmitted and/or received based on the second communication scheme, and
wherein the at least one processor is configured to execute the stored instructions to cause the electronic device to change a mode of the connection interface from the second mode to the first mode if the data rate is less than a reference value.

4. The electronic device of claim 1, wherein the information includes information regarding whether traffic is transmitted and/or received based on the second communication scheme, and
wherein the at least one processor is configured to execute the stored instructions to cause the electronic device to change a mode of the connection interface from the second mode to the first mode if the traffic is transmitted and/or received based on the second communication scheme during a pre-determined period.

5. The electronic device of claim 1, wherein the information includes information regarding at least one application being executed by the electronic device, and
wherein the at least one processor is configured to execute the stored instructions to cause the electronic device to change a mode of the connection interface from the second mode to the first mode if a type of the at least one processor is a designated type.

6. The electronic device of claim 1, wherein the information includes information regarding a movement speed of the electronic device, and
wherein the at least one processor is configured to execute the stored instructions to cause the electronic device to change a mode of the connection interface from the second mode to the first mode if the movement speed is greater than or equal to a designated speed.

7. The electronic device of claim 1, wherein the information includes information regarding a quality of service (QoS) of traffic transmitted and/or received based on the second communication scheme, and
wherein the at least one processor is configured to execute the stored instructions to cause the electronic device to change a mode of the connection interface from the second mode to the first mode if the QoS corresponds to a designated QoS.

8. The electronic device of claim 1, wherein the information includes information regarding a value indicating a state of a battery of the electronic device, and
wherein the at least one processor is configured to execute the stored instructions to cause the electronic device to change a mode of the connection interface from the second mode to the first mode if the value indicating the state of the battery is less than a reference value.

9. A method of operating an electronic device, the method comprising:
detecting whether the electronic device is connected to another electronic device based on a second communication scheme;
identifying information associated with a communication based on that a connection interface operates in a second mode; and
changing a mode of the connection interface from the second mode to a first mode if the information associated with the communication satisfies a designated condition,
wherein the information includes information regarding a modulation and coding scheme (MCS) value associated with traffic that is transmitted and/or received based on a second communication scheme, and
causing the electronic device to change the mode of the connection interface from the second mode to the first mode if the MCS value is less than a reference value.

* * * * *